US012113821B2

(12) United States Patent
Rahouti et al.

(10) Patent No.: US 12,113,821 B2
(45) Date of Patent: *Oct. 8, 2024

(54) COMPUTER NETWORKING WITH SECURITY FEATURES

(71) Applicant: University of South Florida, Tampa, FL (US)

(72) Inventors: Mohamed Rahouti, Tampa, FL (US); Kaiqi Xiong, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,111

(22) Filed: Apr. 7, 2023

(65) Prior Publication Data

US 2023/0254332 A1  Aug. 10, 2023

Related U.S. Application Data

(63) Continuation of application No. 17/166,714, filed on Feb. 3, 2021, now Pat. No. 11,632,385.

(60) Provisional application No. 62/969,540, filed on Feb. 3, 2020.

(51) Int. Cl.
*H04L 9/40* (2022.01)

(52) U.S. Cl.
CPC ...... *H04L 63/1425* (2013.01); *H04L 63/0245* (2013.01); *H04L 63/1416* (2013.01); *H04L 63/166* (2013.01)

(58) Field of Classification Search
CPC ............ H04L 63/1425; H04L 63/0245; H04L 63/1416; H04L 63/166
See application file for complete search history.

(56) References Cited

U.S. PATENT DOCUMENTS

| 7,391,725 B2* | 6/2008 | Huitema | H04L 69/161 370/242 |
| 7,797,443 B1* | 9/2010 | Pettigrew | G06Q 10/107 713/153 |
| 9,154,423 B1* | 10/2015 | Szabo | H04L 63/1458 |
| 9,584,393 B2* | 2/2017 | Kjendal | H04L 67/1095 |

(Continued)

OTHER PUBLICATIONS

Alicherry et al. "High speed pattern matching for network IDS/IPS" InProceedings of the 2006 IEEE International Conference on Network Portocols, Nov. 12, 2006, 187-196.

(Continued)

*Primary Examiner* — Kambiz Zand
*Assistant Examiner* — Afaq Ali
(74) *Attorney, Agent, or Firm* — Owen G. Behrens; Smith & Hopen, P.A.

(57) ABSTRACT

Described herein relates to a system and method for the prevention of a malicious attack on a computing resource. In embodiments, the system may comprise the following, including but not limited to: (1) at least one processor; and (2) computer memory storing instructions that, when executed by the at least one processor, cause the at least one processor to perform operations including: (a) observing traffic flow of a network; (b) altering a SYN threshold value based on the observing of the traffic flow of the network; (c) comparing a metric of SYN messages submitted to the network; and (d) based on the comparison of the metric of SYN messages submitted, selectively engaging corrective action with the network.

20 Claims, 17 Drawing Sheets

(56) References Cited

U.S. PATENT DOCUMENTS

| | | | | |
|---|---|---|---|---|
| 10,108,532 | B1* | 10/2018 | Looney | G06F 11/3664 |
| 10,462,057 | B1* | 10/2019 | Kachmarck | H04L 45/04 |
| 2006/0282508 | A1* | 12/2006 | Venkatsubra | H04L 63/1458 |
| | | | | 709/228 |
| 2007/0115986 | A1* | 5/2007 | Shankara | H04L 63/145 |
| | | | | 370/392 |
| 2013/0272135 | A1* | 10/2013 | Leong | H04L 41/0853 |
| | | | | 370/254 |
| 2014/0082730 | A1* | 3/2014 | Vashist | H04L 63/1416 |
| | | | | 726/23 |
| 2014/0325588 | A1* | 10/2014 | Jalan | H04L 63/1466 |
| | | | | 726/1 |
| 2019/0158591 | A1* | 5/2019 | Kjendal | H04L 43/028 |
| 2020/0314119 | A1* | 10/2020 | Karin | G06F 21/552 |
| 2022/0046042 | A1* | 2/2022 | Amit | H04L 63/1475 |

OTHER PUBLICATIONS

Amann et al. "Providing dynamic control to passive network security monitoring" International Symposium on Recent Advances in Intrusion Detection, Nov. 12, 2015, 21 pages.

Berman et al. "Geni: A federated testbed for innovative network experiments," Computer Networks, Mar. 14, 2014, 61:5-23.

Bharathi et al. "Mitigation of DoS in SDN Using Path Randomization, " InInternational Conference on Computer Networks and Communication Technologies, 2019, 229-239.

Chin et al. "A machine learning framework for studying domain generation algorithm (DGA)-based malware" InInternational Conference on Security and Privacy in Communications Systems, Aug. 8, 2018, 17 pages.

Chin et al. "Kernel-Space Intrusion Detection Using Software—Defined Networking " EAI Endorsed Transactions on Security and Safety, Oct. 1, 2018 5(15): 19 pages.

Chin et al. "An SDN-supported collaborative approach for DDoS flooding detection and containment" InMILCOM 2015-1015 IEEE Military Communication Conference, Oct. 26, 2015, 17 pages.

Chin et al. "Phishlimiter: A Phishing detection and mitigation approach using software-defined networking" IEEE Access, Jun. 18, 2018 6:16 pages.

Chin et al. "SDN-based kernel modular countermeasure for intrusion detection" InInternational Conference on Security and Privacy in Communication Systems, Oct. 22, 2017, 270-290.

Curtis et al. "Mahout: Low-overhead datacenter traffic management using end-host-based elephant detection" In2011 Proceedings IEEE Infocom, Apr. 10, 2011, 1629-1637.

Deng et al. "DoS vulnerabilities and mitigation strategies in software- defines networks" Journal of Network and Computer Applications, Jan. 1, 2019, 125: 36 pages.

Dharmapurikar et al. "Fast and scalable pattern matching for network intrusion detection systems" IEEE Journal on Selected Areas in communications, Oct. 2, 2006, 24(10):1781-1792.

Dhawan et al. "Sphinx: detecting security attacks in software-defined networks" InNdss, Feb. 8, 2015, 15: 15 pages.

Dobrescu et al. "Software dataplane verification" In11th USENIX Symposium on Networked Systems Design and Implementation (NSDI) 14) 2014, 15 pages.

Fichera et al. "OPERETTA: An OPENFlow-based REmedy to mitigate TCP Synflood Attacks against web servers" Computer Networks, Dec. 9, 2015, 92:89-100.

Hong et al. "Poisoning network visibility in software-defined networks: New attacks and countermeasures" InNdss. Feb. 8, 2015, 15:15 pages.

Kumar et al. "SAFETY: Early detection and mitigation of TCP SYN flood utilizing entropy in SDN" IEEE Transactions on Network and Service Management, Jul. 31, 2018, 15(4): 1545-1559.

Li et al. "A Software-defined Networking-based Detection and Mitigation Approach against KRACK" InICETE (2) 2019, 244-251.

McKeown et al. "OpenFlow: enabling innovation in campus networks," ACM SIGCOMM computer communication review, Mar. 31, 2008, 38(2): 69-74.

Mohammadi et al. "SLICOTS: An SDN-Based lightweight countermeasure for TCP SYN flooding attacks" IEEE Transactions on Network and Service Management, May 8, 2017, 14(2): 12 pages.

Nguyen et al. "Analysis of link discovery service attacks in SDN controller" In2017 International Conference on Information Networking (ICOIN), Jan. 11, 2017, 259-261.

Paxson V. Bro: A system for detecting network intruders in realtime. Computer networks. Dec. 14, 1999; 31(23-24): 2435-2463.

Rahouti et al. LatencySmasher: A Software-Defined Networking-Based Framework for End to End Latency Optimization: In 2019 IEEE 44th Conference on Local Computer Networks (LCN) Oct. 14, 2019, 202-209.

Roesch et al. "Snort: Lightweight intrusion detection for networks" InLisa, Nov. 7, 1999, 99(1): 229-238.

Scott-Hayward et al. "A survey of security in software defined networks," IEEE Communications Surveys & Tutorials, Jul. 6, 2015, 18(1): 623-654.

Shang et al. "FloodDefender: Protecting data and control plane resources under SDN-aimed DoS attacks" InIEEE Infocom 2017—IEEE Conference on Computer Communications, May 1, 2017, 1-9.

Shin et al. "Avant-guard: Scalable and vigilant switch flow management in software-defined networks" InProceedings of the 2013 ACM SIGSAC conference on Computer & communications security, Nov. 4, 2013, 413-424.

Tian et al. DoS attack mitigation strategies on SDN controller. In2019 IEEE 9th Annual Computing and Communication Workshop and Conference (CCWC) Jan. 7, 2019 (pp. 0701-0707).

Wang et al. "An entropy-based distributed DDoS detection mechanism in software-defined networking" In2015 IEEE trustcom/BigDataSE/ISPA, Aug. 20, 2015, 1:310-317.

Wang et al. "Floodguard: A dos attack prevention extension in software-defined networks" In 2015 45th Annual IEEE/IFIP International Conference on Dependable Systems and Networks, Jun. 22, 2015, 239-250.

Wang et al. "MinDoS: A Priority-Based SDN Safe-Guard Architecture for DOS Attacks," IEICE Transactions on Information and systems, Oct. 1, 2018, 101(10): 2458-2464.

Wang et al. "SECO: SDN sEcure COntroller algorithm for detecting and defending denial of service attacks" In 2017 5th International Conference on Information and Communication Technology (IColC7), May 17, 2017, 1-6.

Wang et al "SECOD: SDN secure control and data plane algorithm for detecting and defending against DoS attacks" InNoms 2018-2018 IEEE/IFIP Network Operations and Management Symposium, Apr. 23, 2018, 1-5.

Web.archive.org (online), "Floodlight OpenFlow Controller" Apr. 3, 2016, retrieved Mar. 23, 2021.

Wsj.com (online) "Hacker Tangles PANIX Web Site, Jamming Many Corporate Sites" Sep. 12, 1996.

Wu et al. "FMD: A DoS mitigation scheme based on flow migration in software-defined networking" International Journal of Communication Systems, Jun. 2018, 31 (9): e3543, 14 pages.

Zheng et al. "Realtime DDoS defense using COTS SDN switches via adaptive correlation analysis" IEEE Transactions on Information Forensics and security, Feb. 12, 2018, (7) : 14 pages.

* cited by examiner

```
global attempts: table[addr] of count &default=0;

event connection_rejected(c: connection)
{
    local source = c$id$orig_h;         # Get source address.
    local n = ++attempts[source];       # Increase counter.
    if ( n == SOME_THRESHOLD )          # Check for threshold.
        NOTICE(...);                    # Alarm.
}
```

*FIG. 8*

COMPUTER NETWORKING WITH SECURITY FEATURES

CROSS-REFERENCE TO RELATED APPLICATIONS

This nonprovisional application is a continuation of and claims the benefit of U.S. Nonprovisional patent application Ser. No. 17/166,714 entitled "COMPUTER NETWORKING WITH SECURITY FEATURES" filed Feb. 3, 2021 by the same inventors, and U.S. Provisional Patent Application No. 62/969,540 entitled "COMPUTER NETWORKING WITH SECURITY FEATURES" filed Feb. 3, 2020 by the same inventors, all of which are incorporated herein by reference, in their entireties, for all purposes.

BACKGROUND OF THE INVENTION

1. Field of the Invention

This invention relates, generally, to computer-networking security technology. More specifically, it relates to a system and method for SYN Flood Attack Detection and Mitigation, via software-defined networking (hereinafter "SDN").

2. Brief Description of the Prior Art

Computer security, cybersecurity or information technology security (IT security) includes the protection of computer systems and networks from the theft of or damage to their hardware, software, or electronic data, as well as from the disruption or misdirection of the services they provided.

Accordingly, what is needed is a quick, efficient, and safe computer system and network detection and protection system. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to techniques for countering Denial of Service (hereinafter "DoS") attacks and in particular, SYN flood attacks on Software-Defined Networking (hereinafter "SDN")-enabled environments. A variety of Intrusion Detection and Prevention Systems (hereinafter "IDPS") have been introduced for identifying and preventing such security threats, but they often result in significant performance overhead and response time. Therefore, those existing approaches are inflexible for large-scale networks. To address such threats, the disclosed technology provides an adaptive dynamic threshold-based kernel-level intrusion detection and prevention system by leveraging SDN capabilities. In particular, the system can detect and mitigate the aforementioned threats within an SDN over widely-used traditional IDPS technologies, such as Snort and Zeek. The disclosed technologies can use a mixture of fundamental adverse attacks and SDN specific threats on a real world testbed, and are effective at detecting and mitigating SYN flood attacks within an SDN environment.

In one implementation, a system for the prevention of malicious attack on a computing resource includes at least one processor; computer memory storing instructions that, when executed by the at least one processor, cause the at least one processor to perform operations including: observing traffic flow of a network; altering a SYN threshold value based on the observing of the traffic flow of the network; comparing a metric of SYN messages submitted to the network; and based on the comparison of the metric of SYN messages submitted, selectively engaging corrective action with the network.

Such an implementation can optionally include one or more of the following features. The corrective action can include at least one of the group comprising a direct-prevention action, an indirect-prevention action, and a non-prevention action. Altering the SYN threshold value based on the observing of the traffic flow of the network can include selectively: linearly increasing the SYN threshold; and faster-than-linearly decreasing the SYN threshold. Altering the SYN threshold value based on observing of the traffic flow of the network can include altering the SYN threshold according to an additive-increase/multiplicative-decrease scheme. Observing traffic flow of a network can include accessing flow-tables of switches of the network. Observing traffic flow of a network can include accessing packet headers to identify SYN messages.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 8 shows an example rule implementation for counting failed connection attempts per source address, according to an embodiment of the present disclosure.

Like reference symbols in the various drawings indicate like elements.

DETAILED DESCRIPTION OF THE INVENTION

Figure 1:
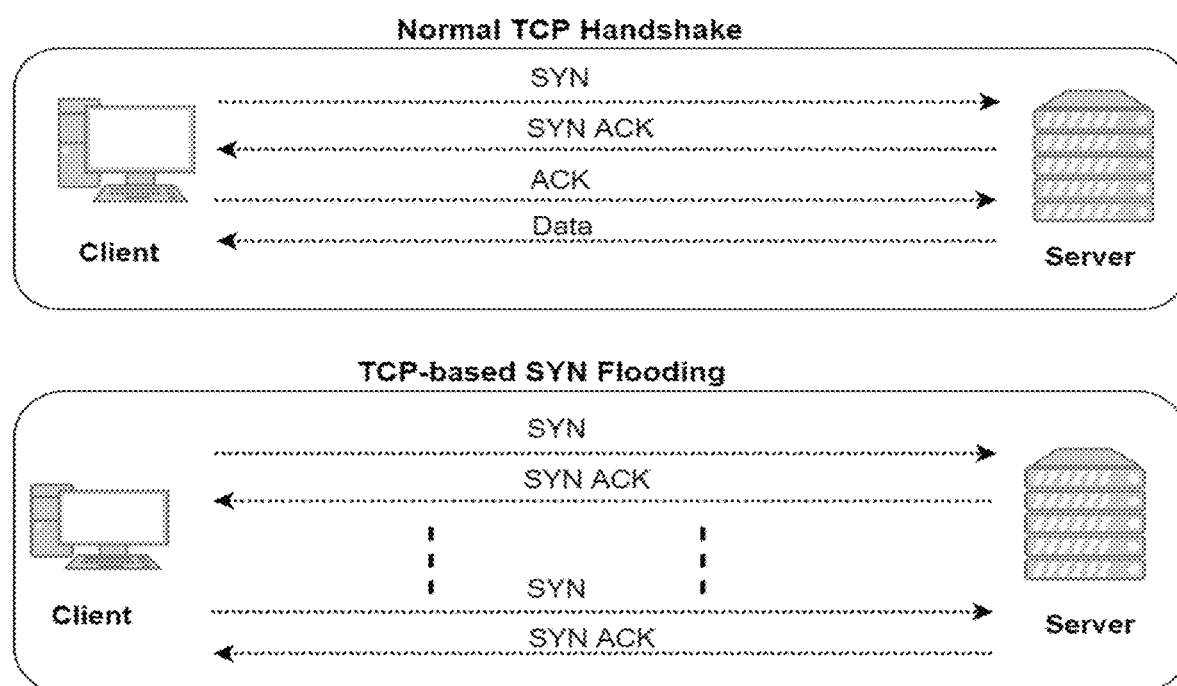
FIG. 1 depicts an example TCP handshake (e.g., top) and an example SYN flooding attack (e.g., bottom), according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims.

Furthermore, the use of certain terms in various places in the specification, described herein, are for illustration and should not be construed as limiting.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Definitions

As used in this specification and the appended claims, the singular forms "a," "an," and "the" include plural referents unless the content clearly dictates otherwise. As used in this specification and the appended claims, the term "of" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g. circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Additionally, some features, described herein, can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Moreover, some features, described herein, can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

As used herein, "about" means approximately or nearly and in the context of a numerical value or range set forth means±15% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

SYN Flood Attack Detection and Mitigation System

The present disclosure pertains to a system (hereinafter "framework") and method comprising a lightweight modular kernel-level filtering solution (e.g., an IDPS solution), named SYNGuard. In an embodiment, the framework is introduced to identify and prevent SYN flooding threats in an SDN environment.

Particularly, in an embodiment, the framework is self-threshold-adjusting and runs as an independent Test Access point (hereinafter "TAP") at the application layer level using Switch Port Analyzer (hereinafter "SPAN") on forwarding devices. Furthermore, the Bloom filter and Aho-Corasick filter are deployed in the solution as partial string matching and exact string matching techniques, respectively. By leveraging strengths of these two approaches and SDN capabilities, the solution allows for an efficient and flexible interchange between these two techniques of string matching in addition to threat signature database update in order to guarantee efficacious detection and mitigation of threats within the kernel space in real-time.

While the IDS signature methods are used to compare a list of given strings or a set of rules with incoming network traffic signatures, the present disclosure describes an approach based on the additive-increase/multiplicative-decrease (hereinafter "AIMD") algorithm to dynamically calculate and update the detection threshold to capture SYN flooding attacks. The adapted AIMD approach is a feedback control approach, which merges both the linear growth of the congestion window along with a reduction when the congestion is identified. In order to demonstrate the performance efficacy of the framework, the framework is experimentally compared with Zeek and Snort, two well-known IDPS solutions through the Global Environment for Network Innovations (hereinafter "GENI"), a real-world heterogeneous and federated testbed. Furthermore, the framework is implemented in Floodlight, an open source SDN controller software, as a Representational State Transfer (hereinafter "REST") Application Program Interface (hereinafter "API").

To thwart this attack, two key issues were considered. (1) How to maintain the main operability of the SDN environment functioning while being under SYN flooding attacks? And (2) how to manage the malicious SYN traffic when mixed with legitimate user networking traffic?

In order to address these challenge while enforcing security policies of the SDN controller during data—to—control layer SYN attack, the presented framework places contingent policy rules in the corresponding OpenFlow switches in a proactive manner. Note that proactive flow rules refer to low-level data plane flow rules, which are created by any application based on the SDN controller state, and consist of forwarding rules of all incoming traffic. Moreover, the insertion of traffic rules in a proactive way helps with maintaining the major operability of the SDN architecture.

Note that the proactive installation of traffic rules does not guarantee a complete protection of the centralized SDN controller, e.g., during SYN saturation attack against the data-to-control layer, the controller might be susceptible to the overloading issue. This is plausible due to saturation traffic can remain outside the SDN-enabled applications logic if it does not match the existing proactive forwarding rules (i.e., in this case the traffic will be forwarded back, which leads to SDN controller's overloading problem). Herein, a possible solution could be rejecting such traffic in order to protect the controller, but however, this will sacrifice considerable legitimate user traffic. Furthermore, in an embodiment, in this framework, incorporated is the cache of data layer through the migration module of the controller with table-miss packets in order to cache packets for a fixed time frame prior to send them to the SDN controller in a rate restricted mode. This way, in this embodiment, the data layer forwarding devices (i.e., OVS) is significantly protected from SYN flooding packets and data—to—control layer saturations are efficiently detected. As such, the behaviors and impact of the SYN saturation against the data—to—control layer are examined with respect to effect on OpenFlow-enabled environment.

Additionally, in an embodiment, the framework uses an additive-increase/multiplicative-decrease (hereinafter "AIMD") algorithm to dynamically calculate and update the threat detection threshold in real-time to efficiently capture malicious SYN flooding traffic.

As previously stated, the framework comprises a SYN-Guard which is a lightweight kernel space security framework to identify and mitigate the SYN flood type of DoS attacks. The SYNGuard is a scalable, lightweight, and protocol independent defense solution to thwart data-to-control layer SYN attack in SDN networks.

In an embodiment, the SYNGuard of the framework is implemented through an open source SDN controller software and test over a real-world heterogeneous and federate testbed. Additionally, the solution is tested in various attack scenarios in a software OpenFlow switch environment. Some experimental findings demonstrate SYNGuard efficiency for given implementations and offers a scalable security mechanism for SDN-enabled environments against SYN flooding threats.

In an SDN-enabled networks, switching devices (e.g., OVS) process packets/flows according to rules injected by the SDN controller. These flow rules are injected by the SDN controller to data plane in either a proactive or reactive manner. While in the proactive manner the controller aims at populating the traffic rules prior to the complete arrival of all traffic to the forwarding device, in the reactive one, the controller injects and adjusts flow rules dynamically and in real-time.

FIG. 1 depicts an example TCP handshake (e.g., top) and an example SYN flooding attack (e.g., bottom), according to an embodiment of the present disclosure. As shown in FIG. 1, a SYN flood DoS attack floods the victim node with an overwhelming quantity of ICMP, SYN/SYN fragments, or UDP traffic. In particular, a SYN flood attack appears when a single or multiple nodes are overwhelmed by SYN segments initiating unaccomplished connection requests and thus will be unable to respond to legitimate connection requests.

In a networking environment, client and server hosts perform three-way handshake in a normal TCP connection, as shown in FIG. 1. As such, as depicted in FIG. 1, a successful establishment of such a connection requires the client to communicate a SYN packet to the server host. Next, once the server receives the SYN packet, it replies with a SYN-ACK packet and immediately assigns a TCP stack for this established connection query.

Once this is achieved, the server will enable the listening state, called transmission control block (hereinafter "TCB"), and remains in it awaiting for the client ACK for a fixed time window. Once the client replies back with ACK packet, the TCP session is successfully performed and thus, client and server can communicate and exchange data.

This session establishment mechanism is susceptible to SYN flooding threats, where an adversary can transmit a massive amount of half-open connections (i.e., TCP connections that are out of synchronization between the client and server) to the server without sending ACK packets, as shown in FIG. 1. This can lead to server resource consumption and new connections from legitimate users cannot be established with the server. Moreover, in some cases, distributed adversary hosts can send a large amount of SYN packets using spoofed IP addresses (e.g., DDoS attack) and make it difficult for the server to identify the attack source.
Threat and Attack Model in SDN FIG. 2 depicts an example SYN flooding attack in an example SDN, according to an embodiment of the present disclosure.

Both the data layer and control layer are assumed to be vulnerable to SYN flooding traffic at the same time. Furthermore, one can assume (1) an attacker is capable to send a large amount of SYN-based traffic to an OpenFlow network and (2) the adversary traffic is assumed to be a mixture of both legitimate and malicious packets and is difficult to differentiate. As such, FIG. 2 shows a realistic scenario illustrating how an attacker floods the SDN infrastructure with SYN stream, according to an embodiment of the present disclosure. In this attack model, the OVS device receives the incoming flood stream that is a mixture of legitimate (i.e., normal user traffic) packets and SYN flooding packets controlled by the adversary host. The adversary herein is capable of producing a large number of SYN packets to saturate the OVS device. Note that when a new packet is received by the OVS and a table-miss takes place, this means that the data layer does not have a respective rule to process the packet. In this case, the packet will be cached in the data layer buffer and a packet in message is sent out to the controller. Therefore, when a massive stream of SYN flooding packets are sent to the data layer from the adversary host, this described packet processing procedure consumes resource in both data layer and control layer.

Figure 2:
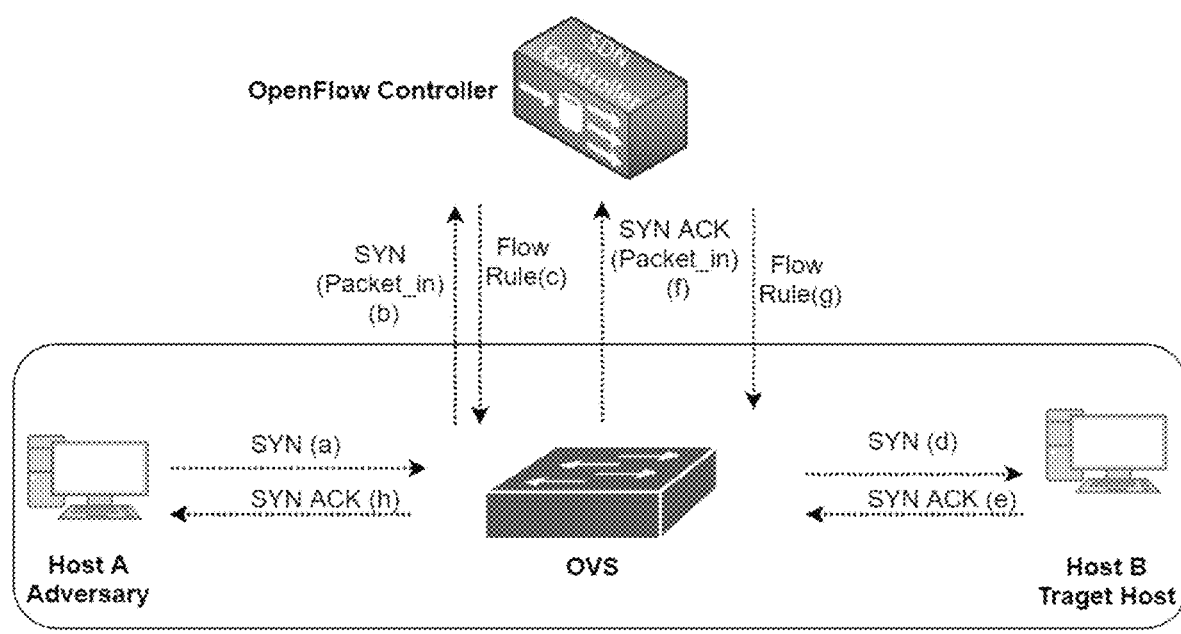
FIG. 2 depicts an example SYN flooding attack in an example SDN, according to an embodiment of the present disclosure.

As presented in FIG. 2, the adversary sends SYN flooding packets (i.e., step a) and once the OVS receives this packet, it will first check its flow table for a matching forwarding rule. If there is no flow rule in the table matching the received SYN packet, the OVS will forward it to the SDN controller (i.e., step b) in the form of packet in message. The SDN controller finds the corresponding path the target host (assuming there is at least one path between Host A and Host B) and inserts the flow rule into the OVS flow table (i.e., step c). Next, the OVS will forward the SYN packet to target node, Host B (i.e., step d). Once Host B receives the SYN packet, it will allocate a new buffer for this SYN request and reply with SYN-ACK (i.e., step e). Following this, once the OVS receives the SYN-ACK, it forwards it again to the SDN controller for flow rule query (i.e., step f). Upon receiving the packet in message from the OVS, the SDN controller once again computes the backward route and inserts it in the OVS flow table (i.e., step g). Lastly, in step h, the OVS sends the SYN-ACK to Host B. Given this handshake-based communication model, the adversary can deploy spoofed IP address and make the SDN controller insert a new forwarding rule (i.e., step g) and thus, the forwarded SYN-ACK packet to Host B will be based on a fake IP address. Moreover, a large number of incomplete SYN connections, as shown in FIG. 1, establishment can cause resource exhaustion of both data layer and control layer It is evident that in this way, SYN flooding leads to exhaustion of both data and control plane resource as well data-to-control communication channel saturation.

In addition, FIG. 2 shows the process of the SYN flooding attack. As known in the art, the component to be impacted first by the flooding traffic is the OVS device. Particularly, the buffer memory of the OVS is rapidly drained and the latency/network throughput is significantly impacted (e.g., the throughput of packet forwarding). Moreover, the communication channel associated with the data—to—control layer will soon be affected by the flood and likely becomes saturated as the SDN controller needs to handle all incoming packet in message from the OVS device. Therefore, the computation capability of the SDN control layer is overloaded in a short time frame.
Motivation and Challenges In SDN-supported networks, the dynamic nature may lead to security and scalability issues. The pre-placement of flow rules in the data layer and dismissing all table-miss flows is not a practical solution as SDN control implementations typically consist of different processing policies and the network is very dynamic (e.g., policies can differ according to the varying network conditions). It is argued that processing policies that are dynamic render controller applications susceptible to security SYN flooding threats because such policies require continuous updates during the data layer transition. In recent versions of OpenFlow protocol, the SDN controller acquires information about data layer transition based on packet in messages. Therefore, when a SYN flooding attack occurs, the controller resource will be exhausted and the trend of current traffic becomes infeasible to anticipate because of the massive amount of packet in messages.

In an embodiment, the framework addresses this challenge through the direct installation of flow rules in the SDN switching devices in runtime. Furthermore, processing table-miss flows without losing the normal user traffic (i.e., legitimate traffic) is another challenge to consider (noting that dropping all table—miss traffic cannot be a solution as it may sacrifice some legitimate traffic as well) while develop ping the framework. Thus, whenever a SYN flooding attack takes place, the framework will send the table—miss traffic to the corresponding data layer cache prior to communicate with the control layer of the SDN via packet in message.

The SYNGuard fulfils the following goals: (1) it is a lightweight, such that it is uses a modular-based filtering technique; (2) an independent application-layer network Test Access Point (hereinafter "TAP") mechanism utilizing the Switch Port Analyzer (hereinafter "SPAN") interfaces on OVS devices; (3) only adds minimal overhead and traffic processing latency; and (4) transparent to end hosts and SDN-enabled applications and can be applicable to larger scale networking environments. The SDN controller uses Spanning Tree Service (hereinafter "STS") in order to prevent the broadcast storm, eke out energy, and block redundant ports when a topology update occurs. However, it is feasible for an adversary host to exploit such a feature to establish a SYN flood DoS incursion. Furthermore, an attacker is assumed to be able to inject a fabricated link for the purpose of troubleshooting the routing function elaborated by the centralized controller. This is feasible by sending a fake Link Layer Discovery Protocol (hereinafter "LLDP") packet to the controller and thus the latter will rely on a fake internal link within the targeted forwarding devices. Lastly, an attacker is capable to breach the path invariants and origin to manipulate Link Discovery Service (hereinafter "LDS") that is used by the controller to identify neighboring switches. The objective here is to exploit the LDS to create fake links between multiple SDN switches.

All of these threat vectors can lead to SYN flood attacks against SDN environment. In order to prevent DoS related attacks while keeping in mind that the proposed SDN-based IDPS is not an absolute solution to identify and prevent all security vulnerabilities in SDN. Malicious users can potentially exploit and or overflow device buffers particular to IDPS tool.

As discussed above, the SDN environment is prone to various breaches and resiliency threats. Malicious end user entities are studied that are capable of conducting such an attack along with legitimate clients who communicate normal user traffic in SDN environments. Thus, the attack vector considered in this research is SYN flood-based DoS attack. Particularly, this document aims to elaborate methods of SYN flood attack scenarios against an SDN-enabled environment built on GENI testbed, elaborated below. SDN controllers are assumed to be safe from adversarial attacks and end hosts are vulnerable to the aforementioned threat vectors. Furthermore, since the mitigation process is crucial to hindering a threat and to denying false positive events, a white-listing mechanism is also employed.

In order to address the previously discussed security issue, presented is a framework and method comprising a lightweight, scalable, and efficacious protocol-independent IDPS solution to protect SDN environments from SYN saturation attacks (i.e., the SYNGuard). The details of the framework and method are provided in the following sections.

Leveraging SDN Capabilities

As known in the art, in SDN environments, any time a packet is observed at the controller level, it is assumed a new incoming one. Assuming the end-to-end communicating nodes are within the SDN environment, the controller inserts respective flow rules into the switch for every new incoming SYN connection request and thus the following incoming flows directed to the same destination will be forwarded without further communication between the switch and the controller. Moreover, SDN controller provides a broad range of statistics and topology information through its statistics collection module. The controller monitors all current traffic and removes flow rules from switch flow tables whenever a flow occurs to be inactive. Such SDN-enabled network functionality is deployed and framework modules are deployed through the controller application plane (i.e., REST API). As the number of end user nodes in the SDN environment is known, IP address associated with targets of new incoming flows are saved to be collected and inspected within windows of a fixed size.

Although some examples use the IP address of potential targets, it is feasible to append any other packet fields to be examined for the threshold estimation and selection.

Adaptive Detection Threshold and Signature Structure

The legitimate user behavior is assumed to initiate SYN request flows in a steady time interval, such that the range of the number of SYN connection request flows is [r1, r2] whereas the number of flows per SYN connection is n>=3. The incoming SYN flows are assumed to follow the Poisson distribution with parameter lambda representing the average number of incoming flows. Noting that the flow table in a switch can provide legitimate user traffic conditions even when an attack incurs and therefore, the number of incoming legitimate SYN flows within a time window Wi are determined. Thus, the average number equation of SYN flows is provided below:

$$Avg = \frac{\sum_{i=1}^{m} vc_i}{m} \quad (1)$$

In the above equation, "m" and "$vc_i$" represent the number of destination addresses in the switch flow table and packet counter with respect to switch flow table, respectively. In order to compute "n", the number of packets per SYN connection, the controller communicates a Flow Statistics Collection (hereinafter "FSC") request in the form of Read—State message to switches with the matched field equal to addresses in the flow table. Hence, using the collected packet-count parameters by the controller, this utilizes their value for each address to compute the value of n as follows:

As such, in the above equation, "F" and "$pc_i$" represent set of flow tables and the minimum packet-count value, respectively.

Additionally, using AIMD (Additive Increase Multiplicative Decrease), where Psi-sub-I and Psi-sub-D represent the updating functions for threshold increase and decrease, the following equation may be presented:

$$\Psi_I = S + 1; \Psi_D = \frac{S}{2}; S_{min} \leq S \leq S_{max} \quad (3)$$

In the above equation, where Smin and Smax represent the minimum and maximum threshold values, respectively, an adaptive version from the Improved AIMD is generated in order to calculate the dynamically adjusting detection threshold based on the current state of SYN flood threat capture. In this manner, the following equation is the Improved AIMD, where Psi-sub-I and Psi-sub-D once again represent the updating functions for threshold increase and decrease:

$$\Psi_I = S_i + \alpha; \Psi_D = \frac{S_i}{\beta} \quad (4)$$

Additionally, in the above equation, where Smin<S<Smax, it is assumed that i=0, $S_i$=P/T and qi=benign-traffic/total-traffic=benign-traffic/n. Legitimate flows are estimated according to the total traffic count and average legitimate traffic (i.e., Equations I and 2). Indeed, even under an attack scenario, the valid flow table in respective OVS has the capability to represent normal user flow conditions because it is known exactly how many normal SYN request packets arrive in the switching device within a time frame T. For simplicity, the equation may replace the two updating functions Psi-sub-I and Psi-sub-D by S(i+I) such that:

$$S(i+1) = P_1 + P_2 \quad (5)$$

Where P1 and P2 are defined as follows:

$$P_1 = p\left(\frac{n}{T} \geq S(i)\right) \cdot [q(i) \cdot \Psi_I(S(i)) + (1 - q(i)) \cdot \Psi_D(S(i))] \quad (6)$$

$$P_2 = p\left(\frac{n}{T} \geq S(i)\right) \cdot [q(i) \cdot \Psi_I(S(i)) + (1 - S(i)) \cdot \Psi_D(S(i))] \quad (7)$$

Simplifying Equation 5, the next threshold value S(i+1) becomes:

$$S(i+1) = q(i) \cdot \Psi_I(S(i)) + 1 + q(i)) \cdot \Psi_D(s(i)) \quad (8)$$

Where, in the above equation, q(i):Psi-sub-1 (S(i))+(1−q (i)); Psu-sub-D(S(i)) is assumed to be an integer, and p(n/ T>=S(i)) and p(n/T<=S(i)) are the probabilities that both events n/T>=S(i) and n/T<=S(i) occur, respectively.

As known in the art, matching based on packet signature may not always be the proper technique to identify SYN flood type of DoS attacks as malicious hosts may be capable to inject arbitrary data into the packet payloads. Therefore, such a technique renders flow capturing based on signatures inefficient. Moreover, TCP SYN flood attack may not have any form of packet payload data (e.g., low-profile TCP SYN flood attack). Hence, in an embodiment, the framework aims at matching the information of packet header instead of the packet payload and therefore, enhances the anomaly detection performance. As such, in order to determine whether arriving traffic is SYN flood attack, in this embodiment, the framework can identify the pattern of incoming flows over a time frame.

In this manner, in an embodiment, when the current threshold value is surpassed by the quantity of arriving flows, the inspection module in the framework recognizes the occurrence of a SYN flood attack and an alert message will be raised. Contrary to existing IDPS solutions, the dynamic threshold in the framework relies on the state of inspection module and frequency of raised alerts. As such, in this embodiment, the IDPS aims at matching the information of SYN packets instead of the entire payload for two reasons: (1) to increase the efficiency of threat signature matching and detection; and (2) SYN packets may not have any particular form of data for the packet payload (e.g., low-profile SYN attack). The proposed algorithm is provided below:

```
P = PACKET_IN; Th = threshold value;
while P :
    T = Time_frame [Timestamps]; S0 = P/T
    if P.Type == ICMP:
        Calculate n/T
        Q{P.SRC_ADDR} ++
        if P.SRC_ADDR NOT IN S:
            S{P.SRC_ADDR} = T
        end if
        else
            if T-S{P.SRC_ADDR} > Th & Si < Smax:
                if Q{P.SRC_ADDR} > Th:
                    Increase Th
                else
                    S{P.SRC_ADDR} = T
                end if
            else
                Decrease Th if Si > Smin
```

Framework Placement and Functionality

Once the framework is initialized, in an embodiment, the inspection module monitors and classifies SYN connections (i.e., established TCP handshakes) while recording source-side timed-out connections (i.e., failed connections). Additionally, once a connection request (i.e., first SYN packet) is received at the data layer, the OVS search for a matched TCP ACK forwarding rule in its flow table or inquires it from the controller otherwise. It is important to note that the OVS also verifies whether the received packet is of TCP SYN type prior to validating the completion of TCP handshaking session to identify unsolicited packets.

Figure 6:
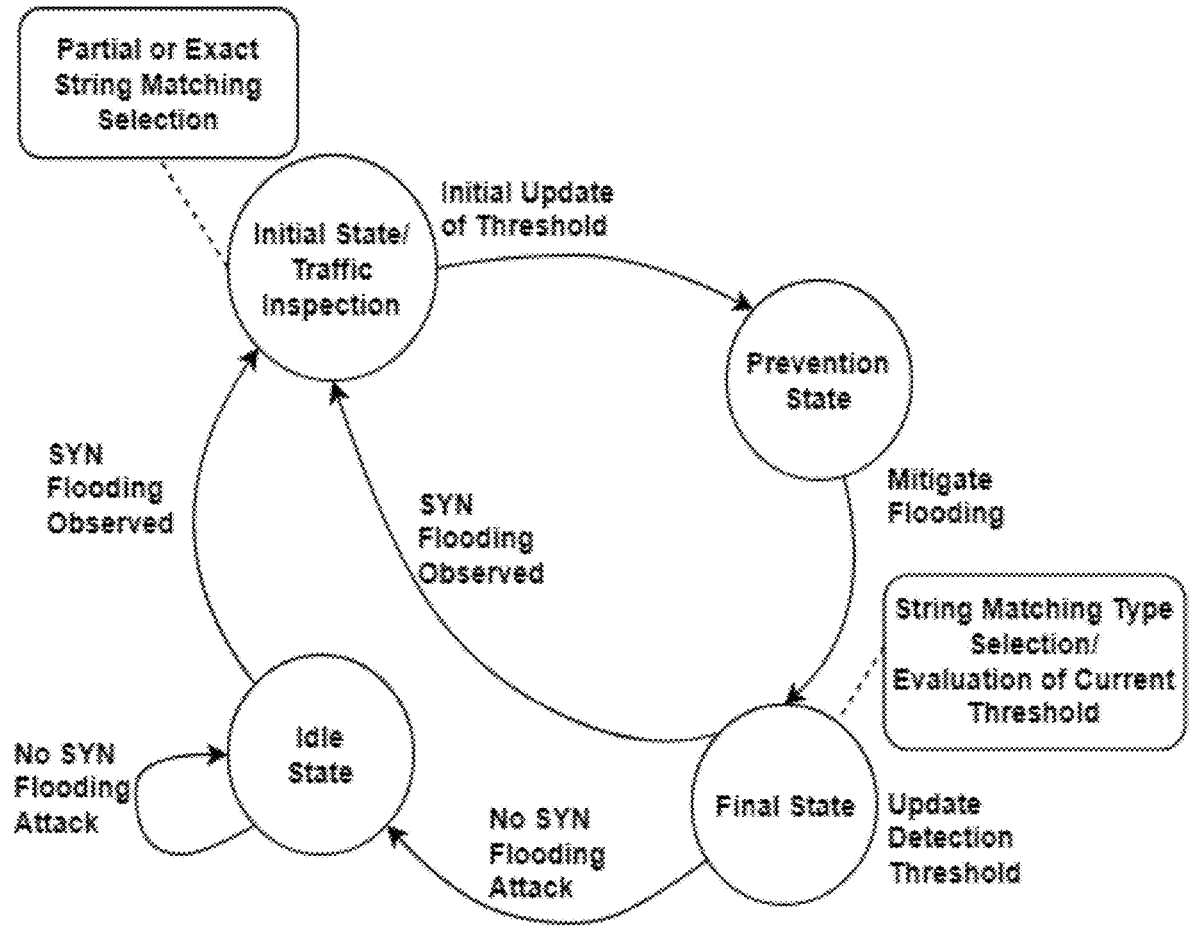
FIG. 6 depicts example states for responding to and mitigating a malicious SYN request, according to an embodiment of the present disclosure.

FIG. 6. depicts a finite-state machine to run the framework, according to an embodiment of the present disclosure. At the initial stage, in this embodiment, the framework needs to symbolize all input variables and global variables deployed in the inspection and mitigation modules.

Figure 3:
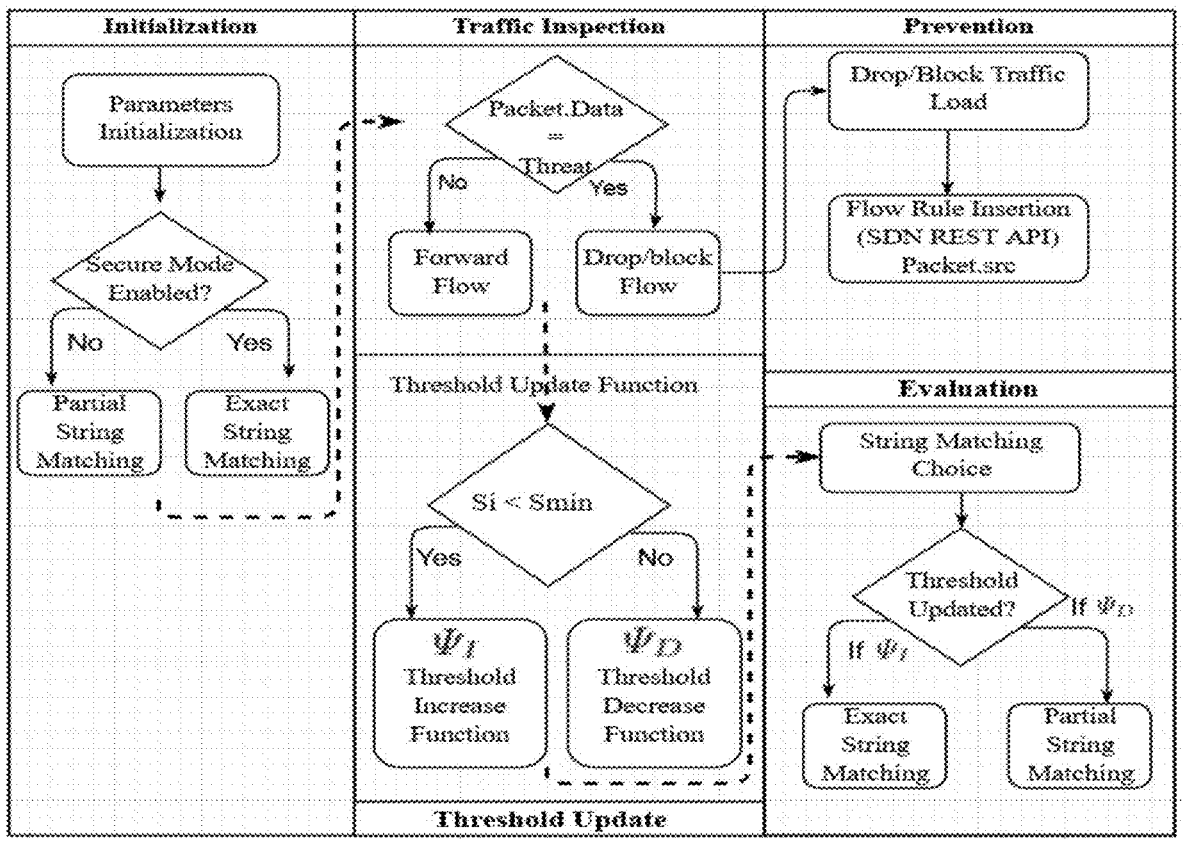
FIG. 3 depicts an example architectural design of the framework, according to an embodiment of the present disclosure.
Figure 4:
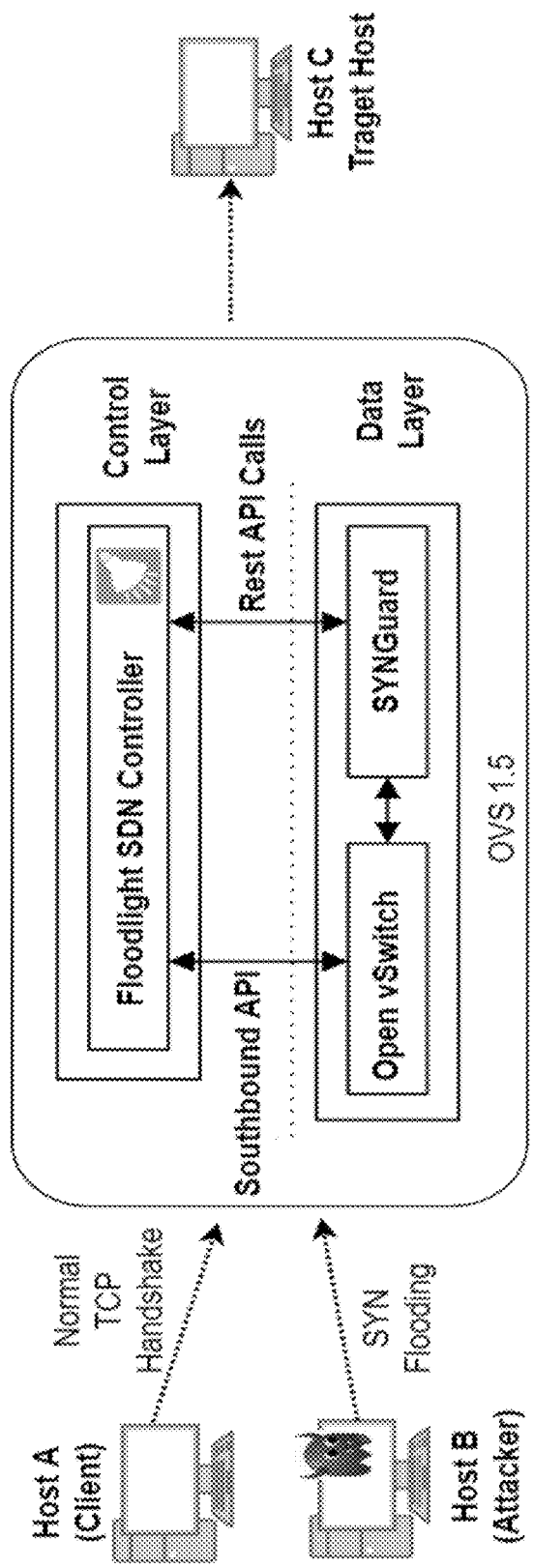
FIG. 4 depicts the example placement and operational states, according to an embodiment of the present disclosure.
Figure 5:
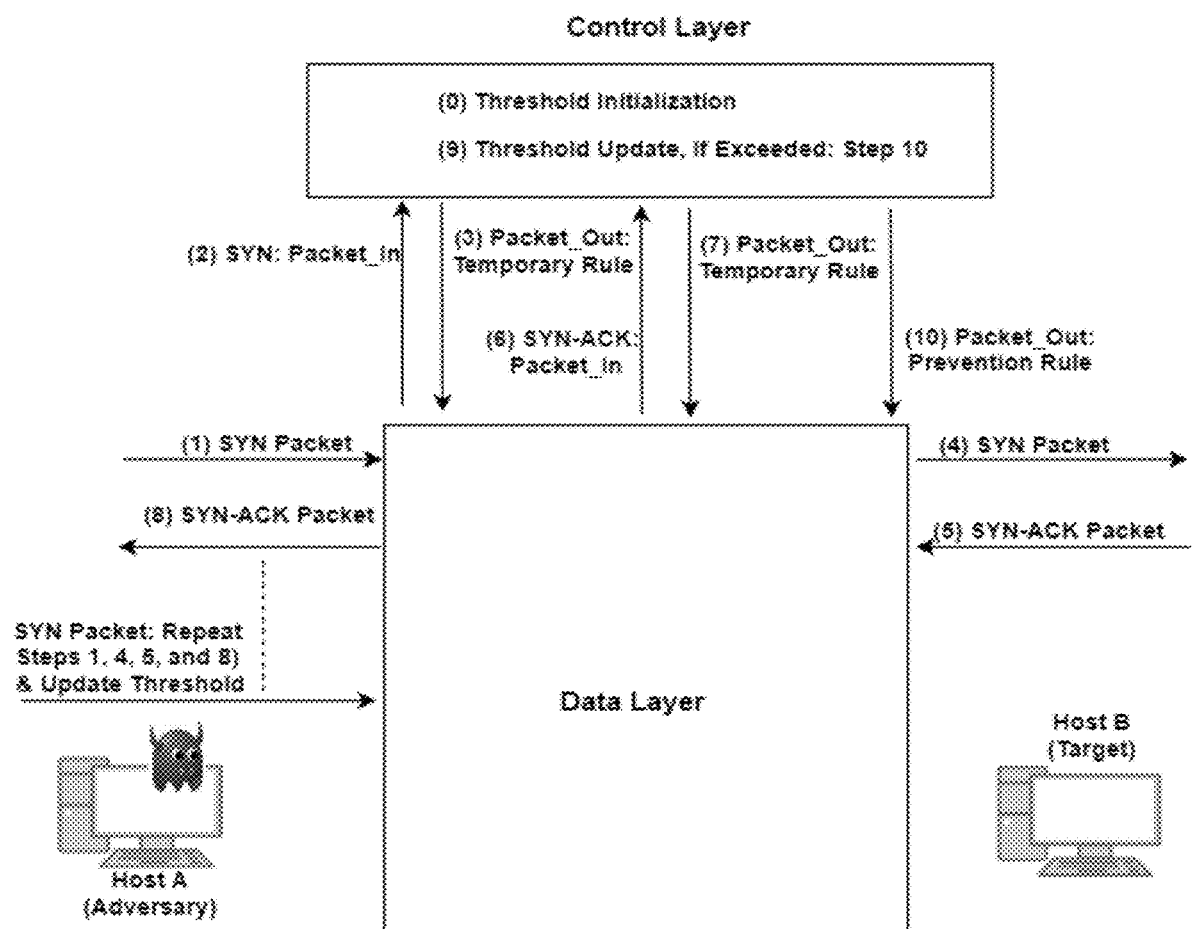
FIG. 5 depicts a scenario of an example response to a malicious SYN request, according to an embodiment of the present disclosure.

Moreover, in this embodiment, the placement of the framework is pivotal to identification and response to threat mitigation timings of the emerging SYN flooding traffic. As such, FIG. 4 depicts the example placement and operational states, whose development is accomplished in a configuration that functions in tandem with an OVS, according to an embodiment of the present disclosure (Noting that networking flows duplication appear within the framework where both the IDPS solution and OVS deploy raw socket-based communication over the software system back-end). Moreover, in this embodiment, the Floodlight SDN controller software utilized in the framework acquires calls from each OVS through the REST API when capturing a threat and raising an alert for mitigation. In this manner, as shown in FIG. 3, in an embodiment, the framework consists of the following four modules: (1) Initialization, which is the initial operational state of the OVS switch; (2) Inspection, the examination module of traffic received through the operating system raw socket; (3) Mitigation, the false positive events prevention module; and lastly (4) Threshold Evaluation module for the dynamic threshold adjustment according to current record of attacks while benefiting from the global controller's view.

As depicted in FIG. 3, in an embodiment, once a flow is received at the respective OVS interface, the associated value will be provisionally recorded and saved, and next, such an information is communicated to the OVS and the framework to initialize the traffic inspection state prior to forwarding it to the potential target. At the initial phase, the threshold should be initialized and assigned a default value by the network administrator. Furthermore, in this embodiment, a secure mode parameter is enabled in the framework such that if an OVS is connected to sensitive data end hosts, the framework will carry out a comprehensive and deep packet payload inspection through the exact string matching algorithm. Accordingly, if the forwarding device is placed in legitimate data regions, the IDPS will only perform a partial string matching. As such, in this embodiment, the framework will continuously inspect and examine all incoming flows, keep track of malignant adversary traffic, and update the threat detection threshold in a synchronous/dynamic manner according to the current trace and intensity of illegitimate traffic. For instance, if a sequence of flows is found to be legitimate, the framework will decrease the threshold Si by a value and also decide about using either the exact string matching filter or partial one. In addition, when a particular flow is found malignant, the controller of the framework will instruct the respective forwarding device to drop/block it.

Furthermore, a stringent aspect to the implementation of the framework is through the critical SDN-plane placement. In an embodiment, the implementation of the framework is done through the SDN application layer, where the implementation of SPAN ports is placed in the OVS in order to mirror all incoming flows on the corresponding device. Precisely, the SPAN port will communicate traffic between the application and the data layer of the SDN. As such, in this embodiment, the inspection phase takes place right after the initialization once traffic enters the framework.

Evaluation

Topology Design

Figure 7:
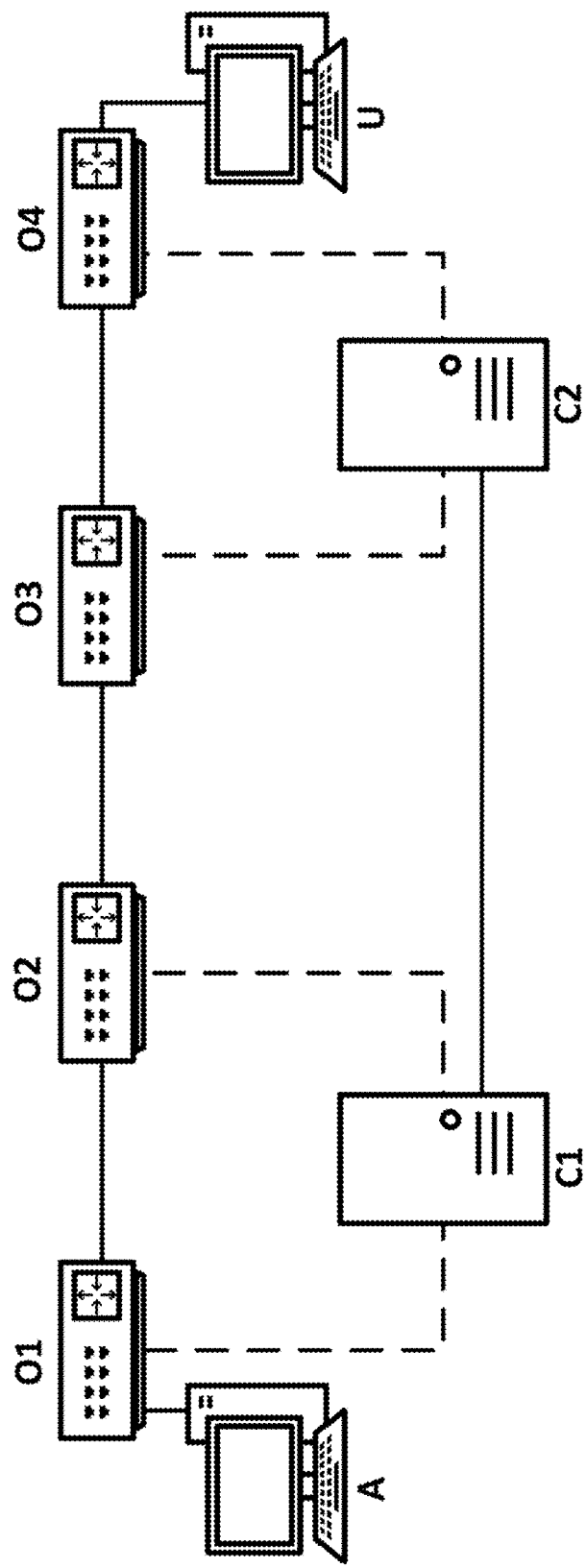
FIG. 7 depicts an example topographical design, according to an embodiment of the present disclosure.

To evaluate the performance of the framework, GENI can be deployed, as GENI is a real-world heterogeneous test bed with various networking capabilities. Therefore, a topology is designed while considering the following key constraints; (1) an adversary host linked to a single network in order to identify fundamental aspects of the framework's response to threats, and (2) an edge-enabled network link for transmitting both adversary and legitimate traffic. FIG. 7 shows an example design of such a topology.

A topological design built on GENI testbed. C1=C2, 01=03, 02=04, U, and A present SDN controllers, OVSs, OVSs running IDPS solution, normal user, and Adversary, respectively.

Traffic Generation and Event Rules Implementation

The response time is evaluated to threats and simulate a real-world networking environment, a mix of the two intent-types of networking traffic, adverse and normal user traffic. To guarantee an SDN-based hybrid network communication, both iPerf and D-ITG are deployed as networking traffic generation tools. The two tools are used in culmination to quantify and control the traffic in the network. Note that iPerf also grants saturation of an edge network link which can be a baseline technique to evaluate the response efficiency to saturation attacks.

TABLE I

THE AVERAGE INSPECTION TIME, MITIGATION TIME, AND AVERAGE LOAD FOR OUR IDPS, SNORT AND ZEEK UNDER VARIOUS TRAFFIC LOADS OF 100K, 200K, AND 500K SYN FLAGGED PACKETS.

| Traffic Load (K) | | | | |
|---|---|---|---|---|
| Metric | IDPS | 100 | 200 | 500 |
| Inspection (Sec.) | Our IDPS | 0.0031 | 0.0068 | 0.0117 |
| | Snort | 0.0041 | 0.0059 | 0.0145 |
| | Zeek | 0.0073 | 0.0102 | 0.0130 |
| Mitigation (Sec.) | Our IDPS | 0.0029 | 0.0081 | 0.0112 |
| | Snort | 0.0045 | 0.0073 | 0.0130 |
| | Zeek | 0.0076 | 0.0100 | 0.0128 |
| System (%) | Our IDPS | 8.04 | 12.70 | 15.09 |
| | Snort | 9.02 | 15.08 | 19.17 |
| | Zeek | 17.53 | 26.05 | 34.19 |

Additionally, both Zeek and Snort utilize rule-based detection mechanisms. The pre-defined detection rules are to be manually added or configured (i.e., if they are already implemented in particular versions). For fair comparisons of performance efficiency, set of rules for SYN flooding attack are inserted for detection and mitigation in both Zeek and Snort accordingly. Therefore, it is important to note that Zeek and Snort both deal with a broad range of network threats and hence, comparing their overhead with the framework will not be meaningful unless all rules, except SYN connection ones, are offloaded or disabled. The following script and FIG. 8 depict sample detection rules of SYN-based DoS flooding traffic for Snort IDS. While Snort raises a TCP-SYN flagged threat alert based on a default threshold value (whenever 70 or more packets are sent within a 10 second interval), Zeek utilizes a threshold n, which is assumed to be manually set at the configuration stage of the IDS, to count the number of failed TCP connections and raises an alert flag whenever this number passes n:

alert tcp any any->$HOME_NET 80(flags:S;
msg:"Possible TCP DoS is Detected!";
flow: stateless;
detection_filter: track by_dist, count 70,
seconds 10; sid 10001;rev: 1;)

Performance Results

FIG. 8. Rule implementation in Zeek for counting the failed connection attempts per source address where n is the threshold to be set by at the configuration stage of Zeek.

As known in the art, the effectiveness of any IDPS is crucial to counter illegitimate traffic. When adverse packets flow from one node to another, resource exhaustion, saturation, and bottlenecks may appear. Therefore, the flow inspection will likely help to computational resource draining. Thus, performance of the framework will be examined with regard to the inspection time, response time to threats (mitigation), threat identification accuracy, and performance overhead in contrast with Zeek and Snort.

Figure 9:
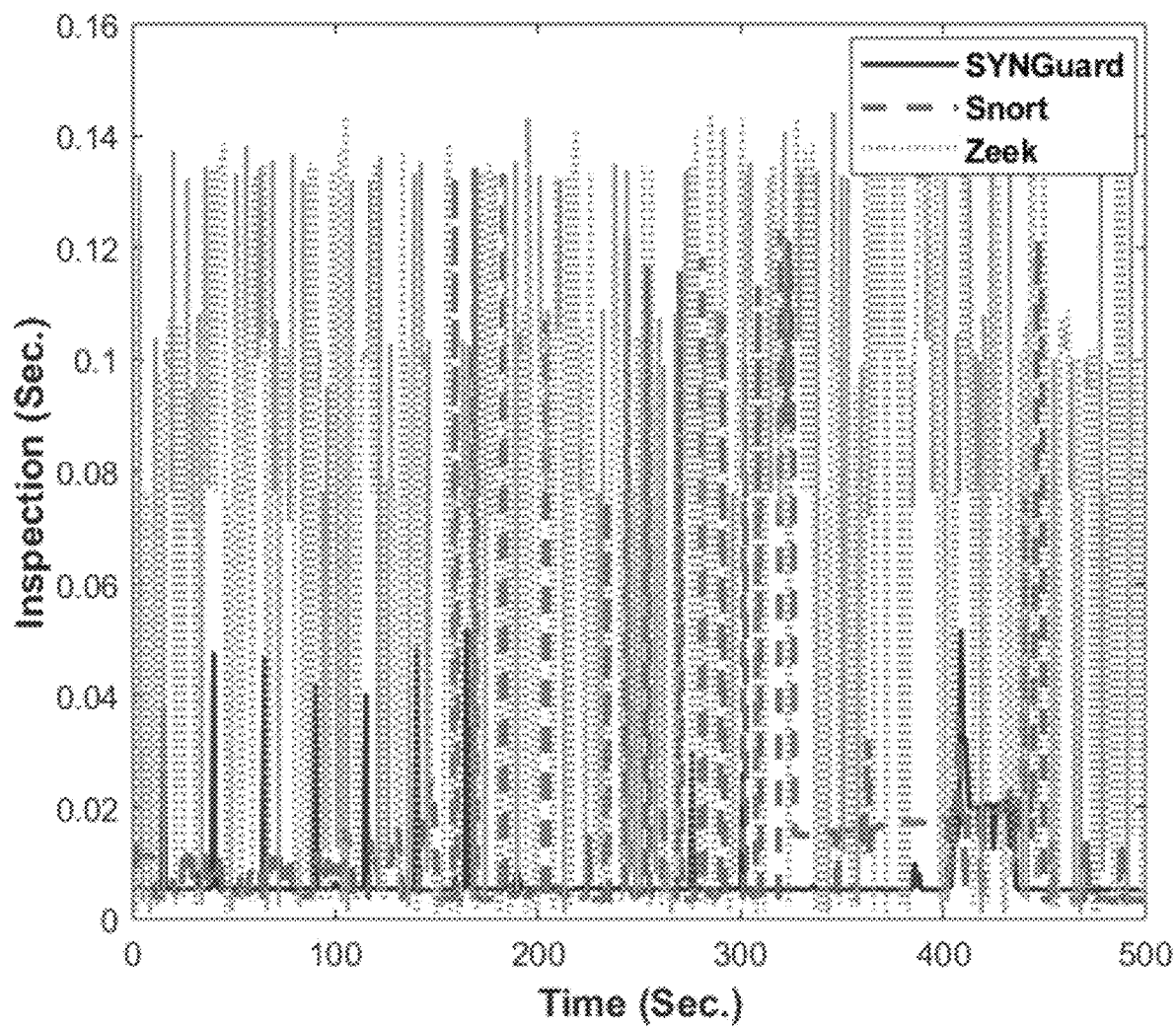
FIG. 9 shows an example average inspection time for the disclosed technology, according to an embodiment of the present disclosure.

FIG. 9. depicts and avg inspection time for the framework, Snort, and Zeek under 300K SYN flagged packet DoS attack using a 10 second detection threshold in both Snort and Zeek.

Inspection Time

In any IDPS solution, the inspection time of incoming flows is critical to the response time to malicious flows. When flows are captured by the IDPS, the packet information must be put in a buffer while awaiting the inspection. Noting that such a waiting time augments the anticipated time previewed for mitigating the attack if an alert is raised. To examine the inspection time in such a solution, Snort and Zeek are implemented with a near-equal configuration to the IDPS. Specifically, for evaluation fairness, each IDPS solution is configured with similar threat detection signatures.

A communication scenario is set between two hosts utilizing hping3. Specifically, packets of a small size are communicated with a massive quantity of packets at the smallest time window (e.g., one nanosecond) in order to accomplish a network link saturation. While the framework autonomously adjusts its detection threshold, the latter is static in both Zeek and Snort and needs to be manually set prior to launching the software. Thus, the two detection thresholds are set to the default values, 10 seconds. Additionally, the experiment was conducted 15 successive times in an automated manner and then average the findings. As such, FIG. 9 and TABLE I depict the resulting average inspection time, according to an embodiment of the present disclosure. Accordingly, the findings demonstrate that the framework outperforms the other two IDPS solutions, Snort and Zeek, where the overall average inspection time in the framework's inspection module is close to Snort but significantly lower than Zeek IDPS.

Figure 10:
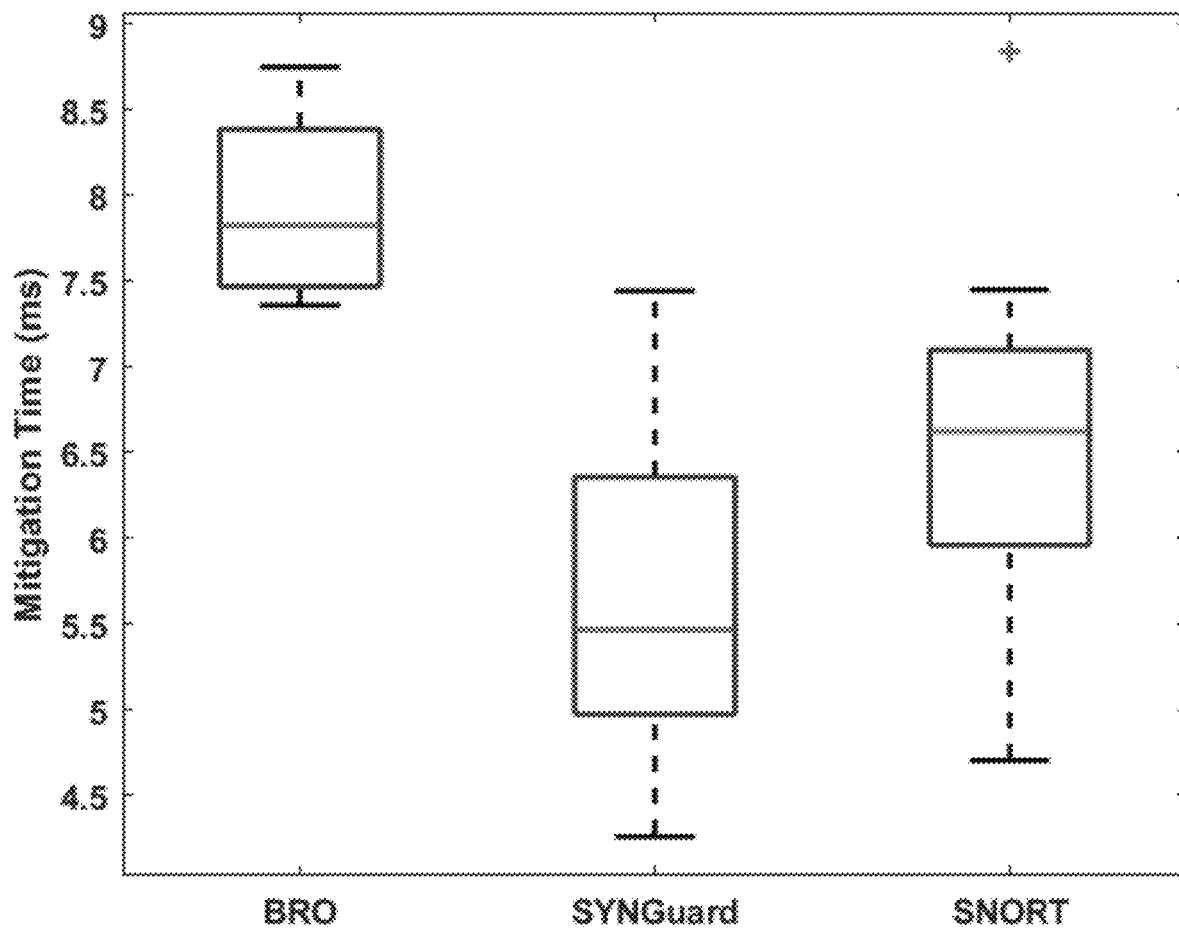
FIG. 10 shows an example box plot representing threat mitigation, according to an embodiment of the present disclosure.

Furthermore, based on the above findings, as shown in FIG. 9 and TABLE I, FIG. 10. depicts an example box plot representing threat mitigation for each IDS under flagged SOOK (packet) SYN flooding attack using 10 second threshold detection in Zeek and Snort, according to an embodiment of the present disclosure.

Mitigation and Response Time

Figure 11:
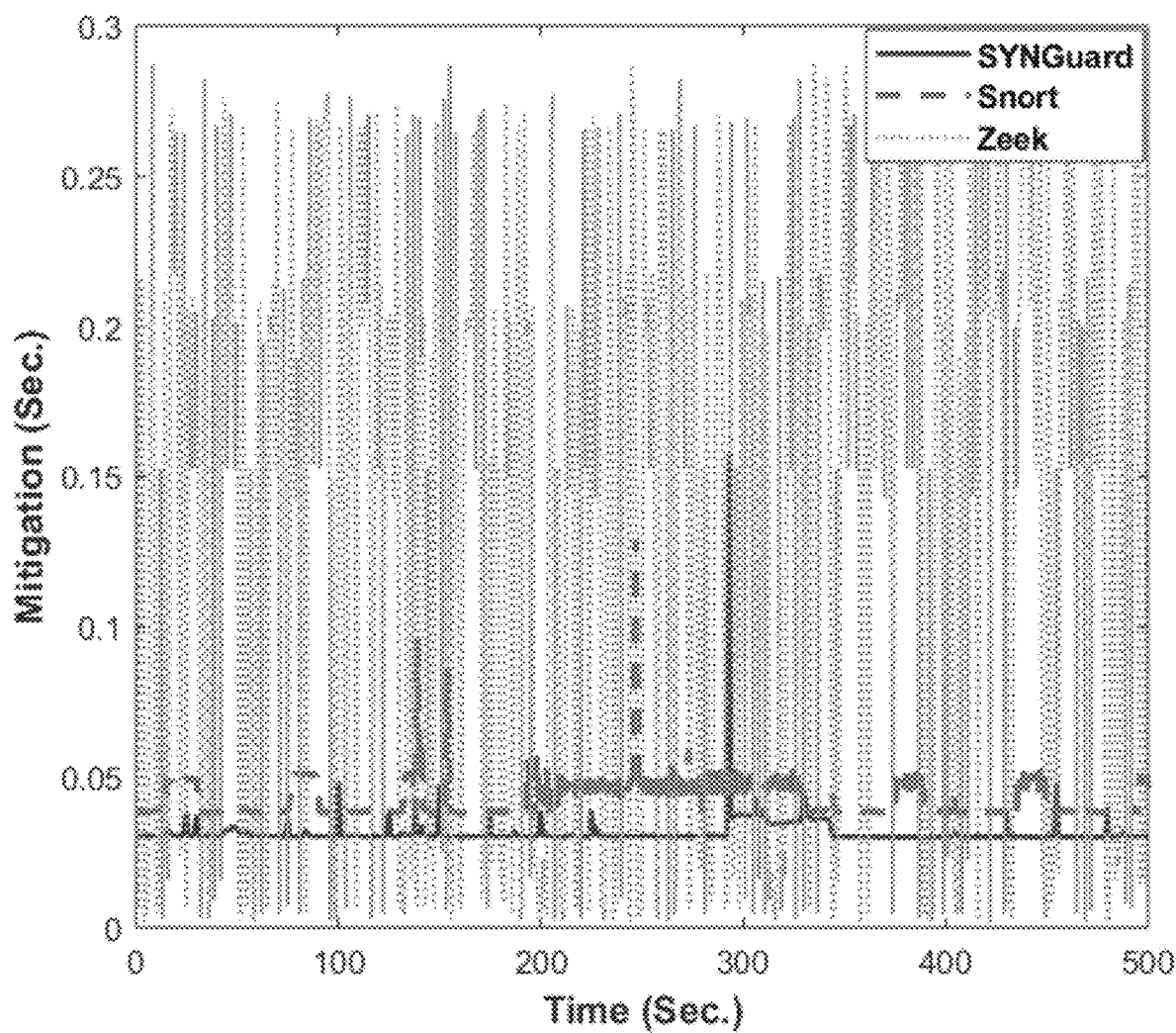
FIG. 11 shows an example average threat mitigation time, according to an embodiment of the present disclosure.

FIG. 11. depicts an avg threat mitigation time for the framework, Snort, and Zeek under 300K SYN flagged packet DoS attack using a 10 second detection threshold in both Snort and Zeek, according to an embodiment of the present disclosure. In addition, the mitigation time is represented as the response time to threatening adversary flows. As such, once a specific flow is found malicious, the mitigation time will be the time between raising an attack alert and the corresponding action (e.g., drop, block). Therefore, this response time is a critical key to assuring the security, well-being, and availability of resources in SDN environment.

While the detection attributes of malicious traffic in each IDPS are unique, herein, an evaluation is made of the efficiency of this solution with regard to mitigation time with contrast to Snort and Zeek once again. The collected mitigation time is the time between each attack's initiation and the time required to rectify the attack.

FIG. 11 and TABLE I present the average mitigation time for the three IDPS solutions, where the same experimental configuration discussed above is followed (threshold initialization, threat detection signature, etc.). The depicted measurements in FIG. 11 are the average times for 15 automated repetitive experiments. The plots show that the framework provides a relatively-similar mitigation time to Snort, but however, it is significantly smaller than Zeek and is still slightly smaller than Snort. The series of SYN flood attacks are elaborated within the SDN topology where the three IDPS solutions guarantee the desired alerting and mitigation operation. The technique associated for response to threats in each IDPS uses the same functioning operation such that once an alert is raised, a blocking action will take a place to mitigate the flooding packets sequence by blocking the corresponding address. Lastly, FIG. 10 depicts the clearness of mitigation time through a box plot where Snort and Zeek utilize a default threshold (10-seconds threshold) value. FIG. 10 shows that the framework overall outperforms both Snort and Zeek in SYN flooding mitigation under flagged SOOK SYN packets. Additionally, FIG. 12. provides a comparison of CPU utilization among Snort, Zeek, Normal, SLICOTS, OPERETTA, and the framework vs. various number of simultaneous attacks sessions from the same source.

Overhead Evaluation

Figure 13:
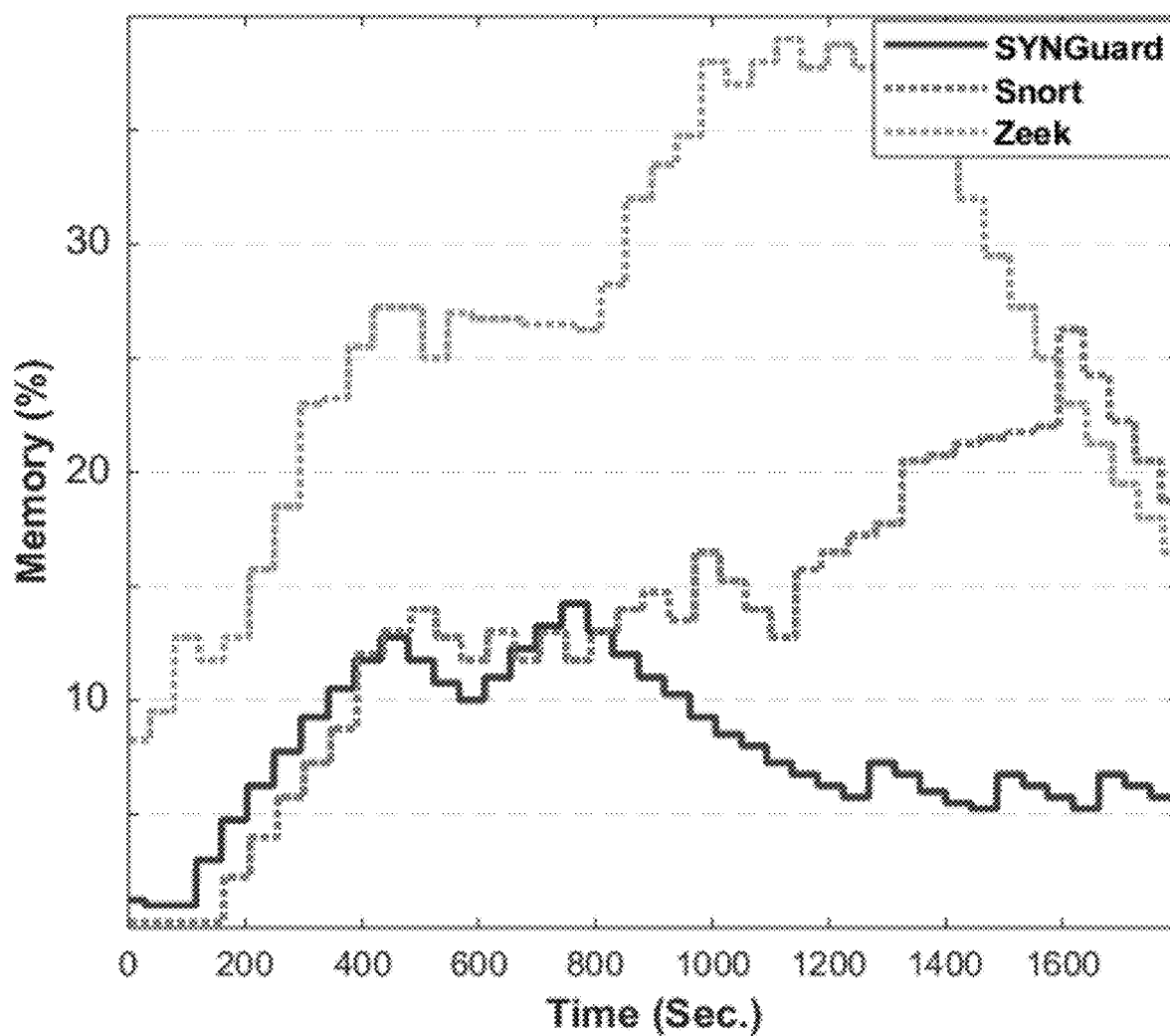
FIG. 13 shows example memory utilization, according to an embodiment of the present disclosure.

As discussed above, when adverse packets flow from one node to another, resource exhaustion, saturation, and bottlenecks may appear within the SDN environment in addition to the IDPS software. The inspection operation can typically lead to resource draining of the device running the IDPS software due to the level of detail in examining the packet content. Therefore, herein are considered examining the overhead of the framework in a comparison with Zeek and Snort. As such, FIG. 13 presents the memory utilization for each IDS under the scenario of a single attack with 200K SYN flagged packets, according to an embodiment of the present disclosure (e.g., Snort and Zeek are initialized at their default detection threshold value, (e.g., 10 seconds)). It is important to note that a full-link saturation was achieved during the attack in this experimental scenario. Moreover, TABLE I presents the system load in terms of average system resource utilization. The experiment is established for each IDPS solution where a variety of network flooding attacks (e.g., different parameters for SYN flood traffic such as, packet size and window size), such as 100 k, 200 k, and 500 k SYN flagged packet attack sent from node A to U (i.e., adversary to user, respectively), as shown in FIG. 7. In order to investigate the performance constraint in the IDPS, samples of system resource consumption are considered to compute averaging CPU utilization in the kernel space. As depicted in FIG. 13, Zeek software demonstrated the highest average value of system resource utilization and therefore remarkable overhead in comparison to the framework and Snort.

Figure 12:
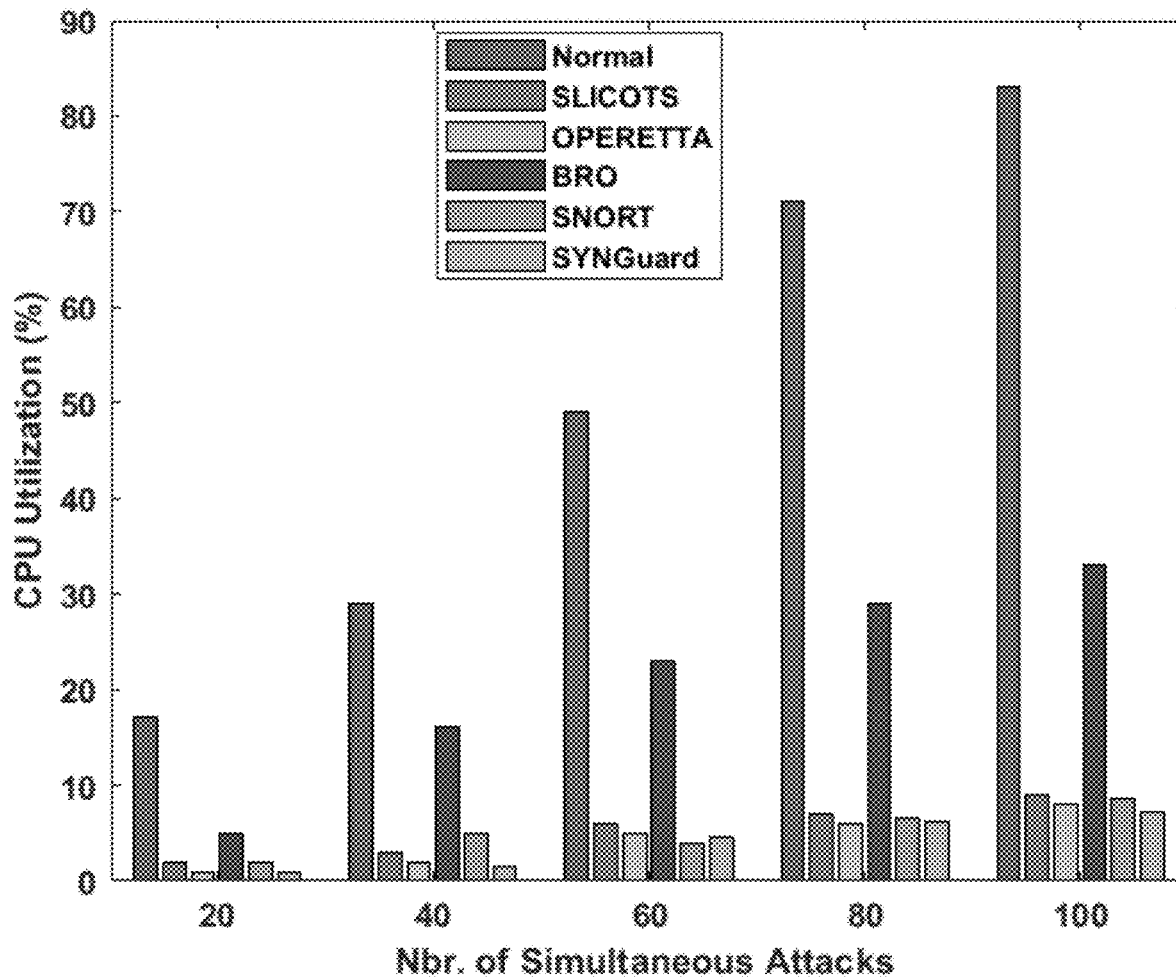
FIG. 12 shows an example comparison of CPU utilization among different technologies, according to an embodiment of the present disclosure.

Additionally, the overhead (i.e., CPU utilization) was compared between the framework, SLICOTS, OPERETTA, Snort, Zeek, and normal SDN. In order to compare the framework with these previously presented solutions, similar experimental scenarios are used where the number of simultaneous SYN flooding attacks is augmented over time windows. It is important to note that both SLICOTS and OPERETTA efficiently prevent saturation of control layer, but however, the framework shows a slightly smaller impact than OPERETTA, Snort, and Zeek on the CPU usage as shown in FIG. 12. Like SLICOTS, the framework benefits from temporary injection of flow rules in OVS devices and thus, the high rate of malicious SYN flooding traffic presents less impact on the control-data channel, which decreases the resource overhead.

FIG. 13. depicts an example memory utilization for each IDS under the scenario of a single attack with 100K SYN flagged packets (hereinafter "Pkt.") using a 10 second threshold detection rate. Additionally, a full-link saturation is achieved during the attack in this evaluation. As such, a security framework to solve SYN flooding threats within SDN environment was proposed. Identified were different attack models for SYN flood DoS attacks on real-word adversary traffic. In an embodiment, the framework allows for a dynamic and self-adjusting detection threshold inspired by the I-AIMD approach. The detection mechanism helms to a better mitigation and response time to malignant flows. Finally, GENI was adopted, a heterogeneous and at-scale real-world testbed to conduct a comprehensive and comparative analysis of the modular framework with popular IDPS solutions, Zeek and Snort. The performance evaluation demonstrated the framework outperforms the other two examined IDPS solutions in terms of accuracy and efficiency with regard to inspection time, mitigation time, and resource consumption.

Figure 14:
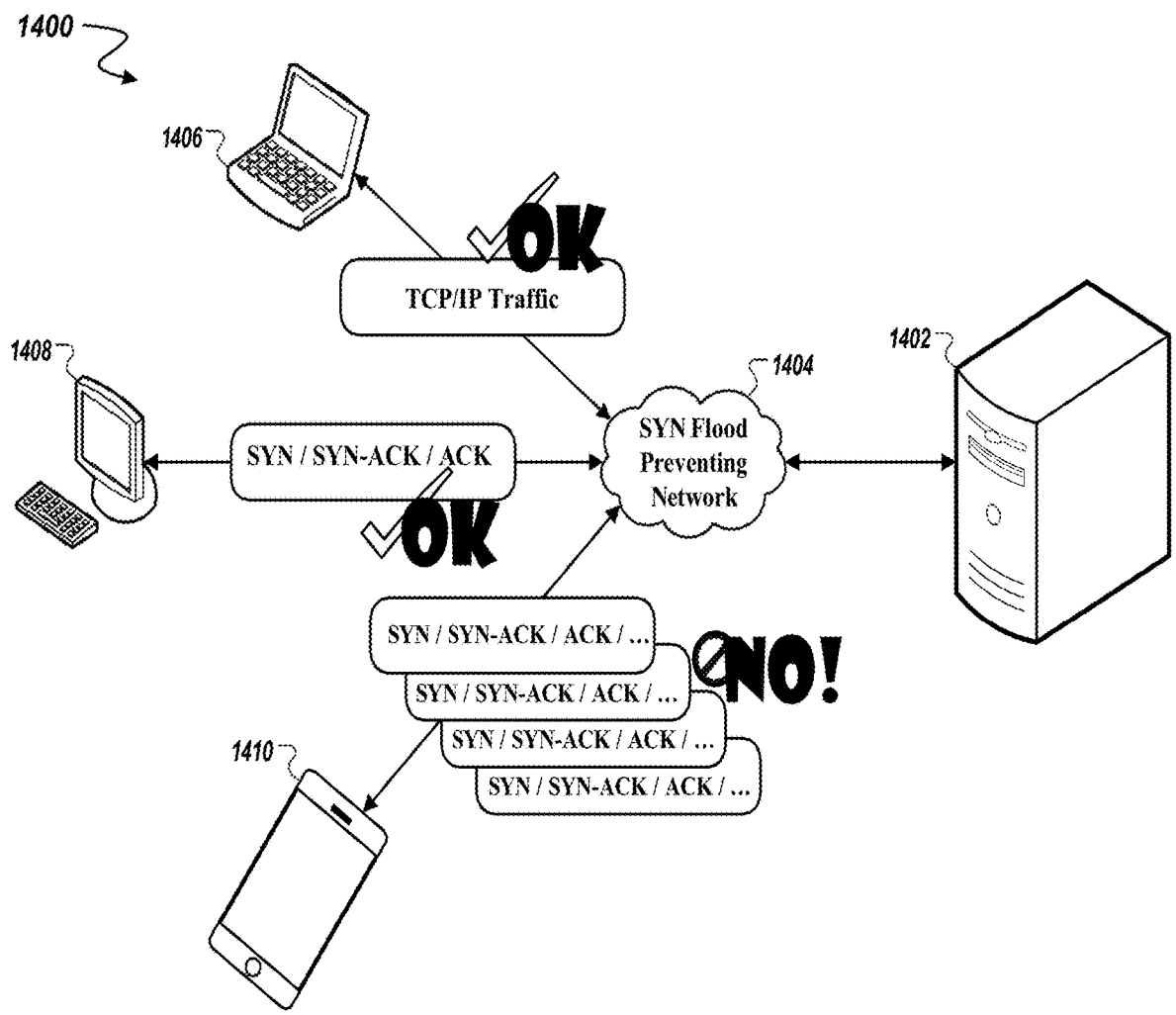
FIG. 14 is an example system that includes identifying and blocking a SYN flood attack, according to an embodiment of the present disclosure.

Furthermore, as shown in FIG. 14, in an embodiment, a system (i.e., the framework) 1400 includes identifying and blocking a SYN flood attack. In the system 1400, a server 1402 is connected to a network 1404 that is configured to protect the server 1402 from SYN flood attacks. As will be understood, in this embodiment, the network 1404 can host other servers and other kinds of hard that may also be protected from SYN flood attacks. The network 1404 can include switches, routers, firewalls, edge-protection devices, and the like. For example, one device or a collection of particular devices of the network 1404 can perform SYN flooding protection functions on data of the network 1404.

Additionally, as shown in FIG. 14, network traffic can be transmitted between the clients 1406-1410 and the server 1402. For example, the clients can send network traffic over the Internet, through the network 1404, to the server 1402, though other arrangements are possible. In this example, the network 1404 is examining the network traffic from each of the clients 1406-1410 to determine if a client, or clients, are attempting a SYN flooding attack. Furthermore, in this embodiment, the client 1406 is engaging in TCP/IP traffic with the server 1402. The network 1404 examines this traffic, determines that the traffic is not indicative of a SYN flooding attack, and permits the traffic to pass.

Moreover, as shown in FIG. 14, in an embodiment, the client 1408 is engaging in a SYN/ACK handshake. For example, the client 1408 can transmit a single SYN message to the server 1402. In response, in this embodiment, the server 1402 can transmit a single, corresponding, SYN-ACK message to the client 1408. In response, the client 1408 can transmit a single ACK message to the server 1402. The network 1404 examines this traffic, determines that the traffic is not indicative of a SYN flooding attack, and permits the traffic to pass.

The client 1410 is engaging in a SYN flooding attack on the server. For example, the client 1410 can transmit a many SYN messages to the server 1402. In response, as shown in FIG. 14, in an embodiment, the server 1402 can transmit a many corresponding SYN-ACK messages to the client 1410. In this manner, the client 1408 can fail to transmit corresponding ACK message to the server 1402. The network 1404 examines this traffic, determines that the traffic is indicative of a SYN flooding attack, and blocks the traffic. In doing so, the network 1404 has prevented the SYN flooding attack, preserving the resources of the server 1402 for the traffic with the servers 1406 and 1408 that are not engaging in a SYN flooding attack.

Figure 15:
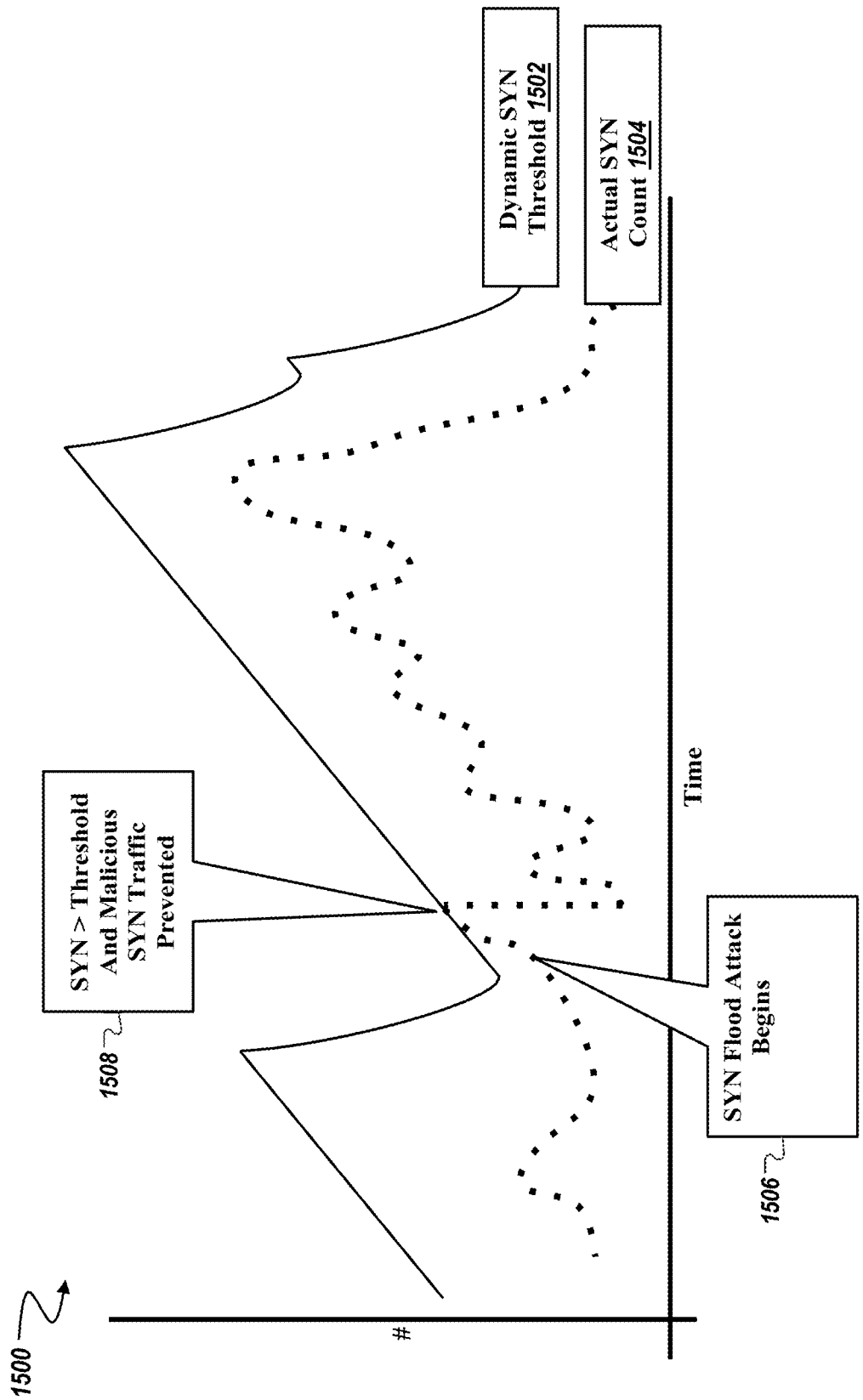
FIG. 15 is a chart that shows an example of SYN traffic compared to a dynamic threshold, according to an embodiment of the present disclosure.

FIG. 15 depicts a chart 1500 that shows an example of SYN traffic compared to a dynamic threshold, according to an embodiment of the present disclosure. The chart shows the changes to a dynamic SYN threshold 1502 used for the purposes of SYN flooding protection as well as a count of actual SYN messages being submitted to a network. As shown, the chart 1500 shows time on the horizontal axis and value for that time in the vertical axis.

The SYN threshold 1502 changes dynamically over time based on the traffic of the network. As has previously been described, the SYN threshold 1502 follows an additive-increase/multiplicative-decrease scheme. As such, the SYN threshold 1502 contains periods of linear, relatively slow growth as well as periods of non-linear, relatively fast decay.

The SYN count 1504 is a count of the number of SYN messages or traffic that is on the network. For most of the time shown, there is no SYN flooding attack, and the count of SYN messages 1504 is roughly related to the SYN threshold 1502. However, from times 1506 to 1508, a malicious client is initiating a SYN flooding attack. As can be seen, in this time period, the SYN count 1504 sharply increases. When the SYN count 1504 reaches (or approaches, passes, reaches for a time period, etc.) the SYN threshold 1502, in an embodiment, the SYN flood prevention mechanisms of the framework engage to prevent the SYN flooding attack from the malicious client. As such, the SYN count drops sharply after time period 1508, returning to the non-SYN flooding behavior.

Figure 16:
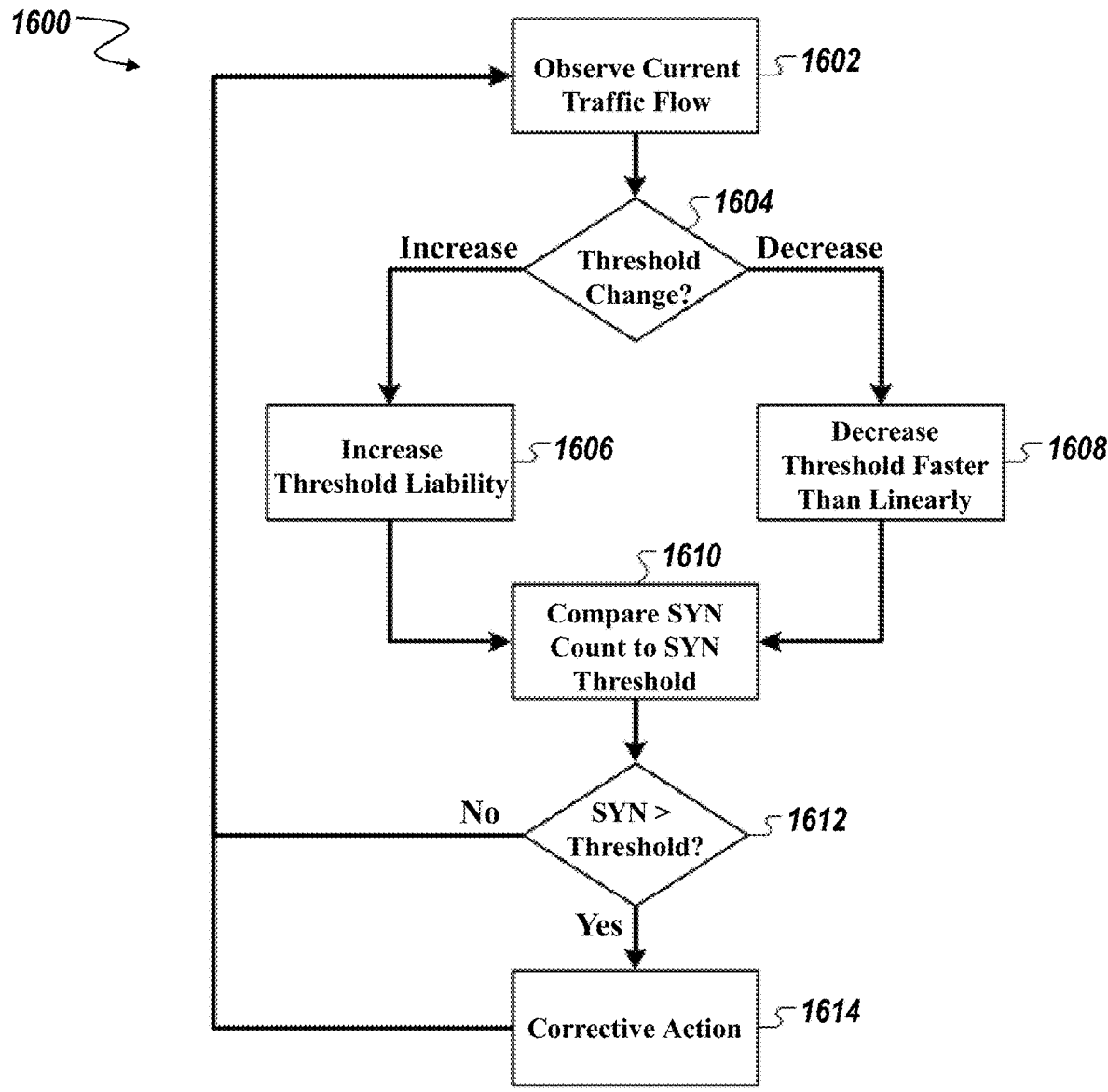
FIG. 16 is a flowchart of an example process for blocking SYN flooding attacks, according to an embodiment of the present disclosure.

FIG. 16, in conjunction with FIG. 14, depicts a flowchart of an example process 1600 for blocking SYN flooding attacks, according to an embodiment of the present disclosure. The process 1600 can be performed by technology described in this document, including but not limited to the system 1400. As such, the following example will be described with reference to the elements of the system 1400, but other elements of other systems may be used to perform the process 1600 or similar processes.

Current traffic flow is observed 1602. For example, the network 1404 can pass traffic between the clients 1406-1410 and the server 1402. As such, in an embodiment, the network 1404 can examine various data-processing elements of the network 1404 to collect information about the traffic of the network, including measures of the amount and types of messages being submitted to the network.

If the SYN threshold should be increased 1604, in this embodiment, the SYN threshold is increased linearly 1606. For example, the network 1404 can submit measures of the volume of traffic to processes (previously described) for adjusting a SYN threshold. If the result of such processes is to increase the SYN threshold, the network 1404 can increase the SYN threshold linearly. This linear increase can be the result of adding a constant value greater than zero to the current SYN threshold, though other processes for linear increase are possible.

Additionally, as shown in FIG. 16, in conjunction with FIG. 14, if the SYN threshold should be decreased 1608, in an embodiment, the SYN threshold is decreased faster than linearly 1608. For example, the network 1404 can submit measures of the volume of traffic to processes (previously described) for adjusting a SYN threshold. If the result of such processes is to decrease the SYN threshold, in this embodiment, the network 1404 can decrease the SYN threshold faster than linearly. This faster-than-linear decrease can be the result of dividing the SYN threshold by a positive value greater than one.

Next, the SYN count is compared to the SYN threshold 1610. For example, the network 1404 can compare the SYN count, or another metric reflecting the SYN volume submitted to the network 1404, to the SYN threshold. This comparison may be a simple direct comparison looking for any single instance of the SYN count being greater than the SYN threshold, though other comparisons are possible. For example, the comparison may include determining if the SYN count is greater than the SYN threshold for a given period of time, by more than a given amount, for at least N out of M consecutive SYN counts, etc.

If the SYN count is not greater than the SYN threshold 1612, in an embodiment, corrective action to prevent SYN flooding is not engaged. For example, the network 1404 may determine that no SYN flooding attack is being attempted, and thus no corrective action is taken by the network 1404.

If the SYN count is greater than the SYN threshold 1612, in an embodiment, corrective action to prevent SYN flooding is engaged 1614. For example, the network 1404 may determine that a SYN flooding attack is being attempted, and the network 1404 may responsively engage one or more corrective actions. In this embodiment, the corrective actions may in some cases directly prevent the SYN flooding attack. For example, a malicious client 1410 may be quarantined from the network 1404 so that communication to and from the client 1410 is blocked. The corrective actions may in some cases indirectly prevent SYN flooding. For example, in an embodiment, the malicious client 1410 may be flagged for heightened security so that communications to and from the client are subjected to extra testing before being permitted. In this manner, this extra testing may include applying computationally expensive tests to the client's 1410 network traffic that is not applied to other traffic. In another example, the network 1410 can gather information about the malicious client 1410 (e.g., network address information, logging of traffic, etc.) The corrective action may in some cases not be configured to prevent the SYN flooding attack. For example, in an embodiment, an electronic message addressed to an administrator of the network 1404 can be generated and transmitted to a computing device associated with the administrator of the network 1404.

Figure 17:
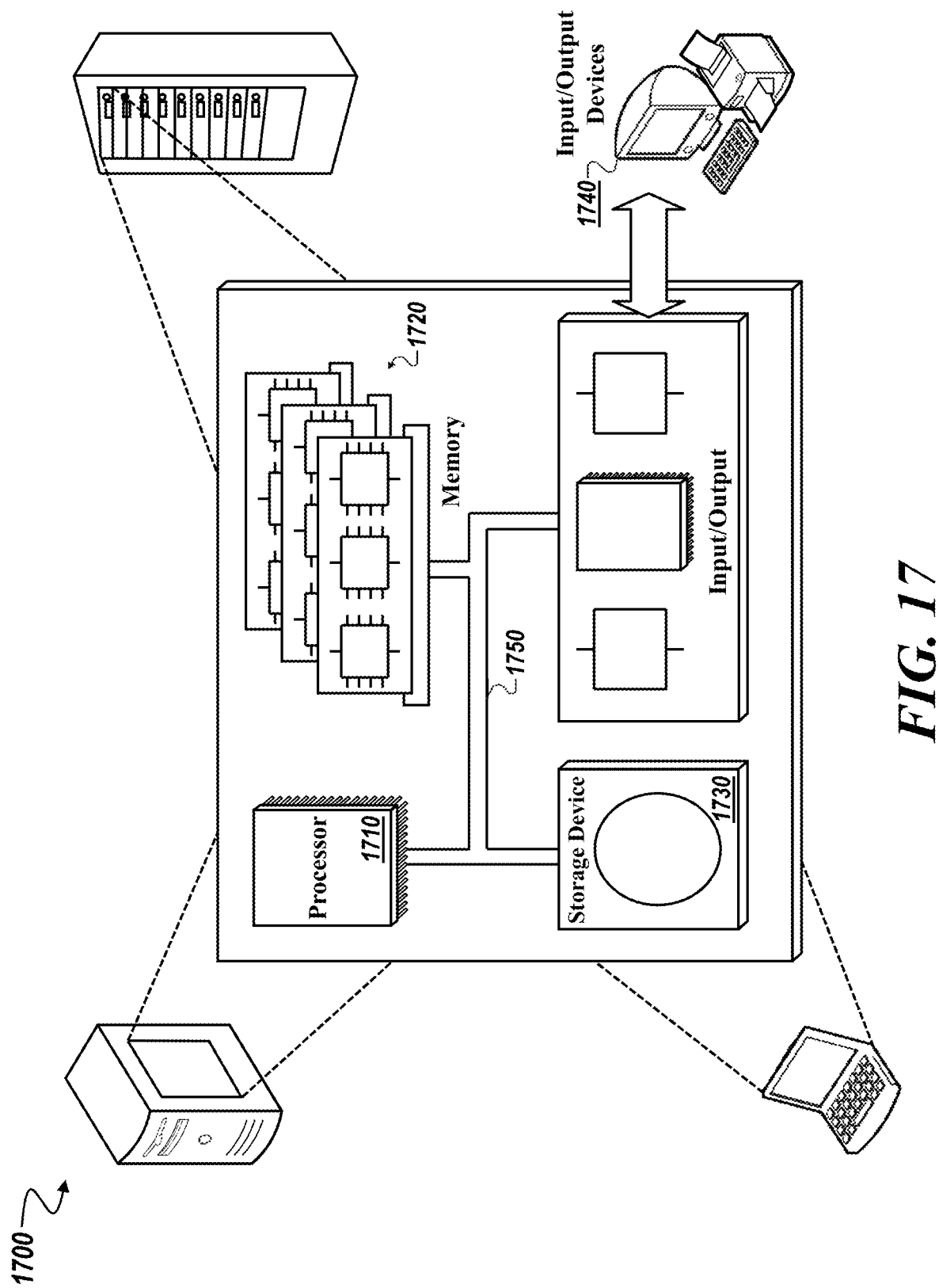
FIG. 17 is a schematic diagram that shows an example of a computing device and a mobile computing device, according to an embodiment of the present disclosure.

FIG. 17 depicts a schematic diagram that shows an example of a computing system 1700, according to an embodiment of the present disclosure. The computing system 1700 can be used for some or all of the operations described previously, according to some embodiments. In an embodiment, the computing system 1700 includes a processor 1710, a memory 1720, a storage device 1730, and an input/output device 1740. Each of the processor 1710, the memory 1720, the storage device 1730, and the input/output device 1740 are interconnected using a system bus 1750. As such, in this embodiment, the processor 1710 is capable of processing instructions for execution within the computing system 1700. In some implementations, the processor 1710 is a single-threaded processor. Additionally, in some implementations, the processor 1710 is a multi-threaded processor. In this manner, the processor 1710 is capable of processing instructions stored in the memory 1720 or on the storage device 1730 to display graphical information for a user interface on the input/output device 1740.

Additionally, in an embodiment, the memory 1720 stores information within the computing system 1700. In some implementations, the memory 1720 is a computer-readable medium. In some implementations, the memory 1720 is a volatile memory unit. In some implementations, the memory 1720 is a non-volatile memory unit.

Moreover, in this embodiment, the storage device 1730 is capable of providing mass storage for the computing system 1700. In some implementations, the storage device 1730 is a computer-readable medium. In various different implementations, the storage device 1730 may be a floppy disk device, a hard disk device, an optical disk device, or a tape device.

Furthermore, in this embodiment, the input/output device 1740 provides input/output operations for the computing system 1700. In some implementations, the input/output device 1740 includes a keyboard and/or pointing device. In some implementations, the input/output device 1740 includes a display unit for displaying graphical user interfaces.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A system for preventing malicious attacks on a computing resource, via a software-defined networking (hereinafter "SDN") application layer, the system comprising:
   at least one processor;
   computer memory storing instructions that, when executed by the at least one processor, cause the at least one processor to perform user-space operations in a user-space and to perform kernel operations in a kernel-space different from the user-space, the kernel-space operations comprising:
      placing at least one Switch Port Analyzer (hereinafter "SPAN") port in an Open vSwitch (hereinafter "OVS") to mirror a traffic flow of a network on a corresponding computing device;
      subsequent to an initialization of the OVS, immediately observing the traffic flow of the network once the traffic flow enters the network, wherein the traffic flow includes SYN messages that are exchanged between computing devices to establish Transmission Control Protocol (TCP) network connections; and
      altering a SYN threshold value based on the observing of the traffic flow of the network, wherein the SYN threshold corresponds to a quantity of SYN messages transmitted over a period of time to differentiate between normal network behavior and malicious network behavior.

2. The system of claim 1, wherein the kernel-space operations further comprises the step of:
   determining whether there is malicious network behavior on the network based on a comparison of the SYN threshold to a metric of the SYN messages submitted to the network.

3. The system of claim 2, wherein after determining whether there is malicious network behavior on the network, the kernel-space operations further comprises the step of:
   in response to determining that there is malicious network behavior on the network, selectively engaging, by the computing system, corrective action with the network.

4. The system of claim 1, wherein the corrective action comprises at least one of the group comprising a direct-prevention action, an indirect-prevention action, and a non-prevention action.

5. The system of claim 1, wherein altering the SYN threshold value based on the observing of the traffic flow of the network comprises selectively:
   linearly increasing the SYN threshold; and
   faster-than-linearly decreasing the SYN threshold.

6. The system of claim 1, wherein altering the SYN threshold value based on observing of the traffic flow of the network comprises altering the SYN threshold according to an additive-increase/multiplicative-decrease scheme.

7. The system of claim 1, wherein observing traffic flow of a network comprises accessing flow-tables of switches of the network.

8. The system of claim 1, wherein observing traffic flow of a network comprises accessing packet headers to identify SYN messages.

9. A method for the prevention of malicious attack on a computing resource, via a software-defined networking (hereinafter "SDN") application layer, the method comprising:
    placing at least one Switch Port Analyzer (hereinafter "SPAN") port in an Open vSwitch (hereinafter "OVS") to mirror a traffic flow of a network on a corresponding computing device;
    subsequent to an initialization of the OVS, immediately observing, by a computing system comprising at least one processor and memory, the traffic flow of the network once the traffic flow enters the network, wherein the traffic flow includes SYN messages that are exchanged between computing devices to establish Transmission Control Protocol (TCP) network connections, wherein observing traffic flow of the network in a secure mode comprises an exact string matching of the traffic flow of the network and alternatively observing traffic flow of the network in a second mode comprises a partial string matching of the traffic flow of the network;
    altering a SYN threshold value based on the observing of the traffic flow of the network, wherein the SYN threshold corresponds to a quantity of SYN messages transmitted over a period of time to differentiate between normal network behavior and malicious network behavior; and
    mirroring, by the computing system comprising at least one processor and memory, the traffic flow of the network, the altered SYN threshold value, or both on the corresponding computing devices within the TCP network connections.

10. The method of claim 9, wherein the corrective action comprises at least one of the group comprising a direct-prevention action, an indirect-prevention action, and a non-prevention action.

11. The method of claim 9, wherein altering the SYN threshold value based on the observing of the traffic flow of the network comprises selectively:
    linearly increasing the SYN threshold; and
    faster-than-linearly decreasing the SYN threshold.

12. The method of claim 9, wherein altering the SYN threshold value based on the observing of the traffic flow of the network comprises altering the SYN threshold according to an additive-increase/multiplicative-decrease scheme.

13. The method of claim 9, wherein observing traffic flow of a network comprises accessing flow-tables of switches of the network.

14. The method of claim 9, wherein observing traffic flow of a network comprises accessing packet headers to identify SYN messages.

15. A computer-readable memory tangibly storing instructions that,
    when executed by at least one processor, cause the at least one processor to perform operations, via a software-defined networking (hereinafter "SDN") application layer, comprising:
    placing at least one Switch Port Analyzer (hereinafter "SPAN") port in an Open vSwitch (hereinafter "OVS") to mirror a traffic flow of a network on a corresponding computing device;
    subsequent to an initialization of the OVS, immediately observing the traffic flow of the network once the traffic flow enters the network, wherein the traffic flow includes SYN messages that are exchanged between computing devices to establish Transmission Control Protocol (TCP) network connections;
    altering a SYN threshold value based on the observing of the traffic flow of the network, wherein the SYN threshold corresponds to a quantity of SYN messages transmitted over a period of time to differentiate between normal network behavior and malicious network behavior;
    mirroring, by the computing system comprising at least one processor and memory, the traffic flow of the network, the altered SYN threshold value, or both on the corresponding computing devices within the TCP network connections; and
    determining whether there is malicious network behavior on the network based on a comparison of the SYN threshold to a metric of the SYN messages submitted to the network.

16. The computer-readable memory of claim 15, wherein the corrective action comprises at least one of the group comprising a direct-prevention action, an indirect-prevention action, and a non-prevention action.

17. The computer-readable memory of claim 15, wherein altering the SYN threshold value based on the observing of the traffic flow of the network comprises selectively:
    linearly increasing the SYN threshold; and
    faster-than-linearly decreasing the SYN threshold.

18. The computer-readable memory of claim 15, wherein altering the SYN threshold value based on the observing of the traffic flow of the network comprises altering the SYN threshold according to an additive-increase/multiplicative-decrease scheme.

19. The computer-readable memory of claim 15, wherein observing traffic flow of the network in a secure mode comprises an exact string matching of the traffic flow of the network and alternatively observing traffic flow of the network in a second mode comprises a partial string matching of the traffic flow of the network.

20. The computer-readable memory of claim 15, wherein the operations further comprise the step of:
    after determining that there is malicious network behavior on the network, selectively engaging corrective action with the network.

\* \* \* \* \*